(12) United States Patent
Xu

(10) Patent No.: US 6,871,022 B2
(45) Date of Patent: Mar. 22, 2005

(54) CASCADED OPTICAL MULTIPLEXER

(75) Inventor: Xiaojie Xu, Campbell, CA (US)

(73) Assignee: Stratos International, Inc., Chicago, IL (US)

( * ) Notice: Subject to any disclaimer, the term of this patent is extended or adjusted under 35 U.S.C. 154(b) by 585 days.

(21) Appl. No.: 09/952,286

(22) Filed: Sep. 14, 2001

(65) Prior Publication Data

US 2003/0053167 A1 Mar. 20, 2003

(51) Int. Cl.[7] .............................................. H04J 14/00
(52) U.S. Cl. ............................ 398/53; 398/41; 398/46; 398/65; 398/74; 398/82; 398/83; 398/84; 398/85; 398/86; 398/87; 398/88; 359/494; 359/495; 359/496; 359/497; 359/498; 359/499; 359/500
(58) Field of Search ........................... 398/43, 53, 68, 398/74, 82–88; 359/494–500

(56) References Cited

U.S. PATENT DOCUMENTS

| | | | |
|---|---|---|---|
| 3,825,348 A | | 7/1974 | Nomarski et al. .......... 356/107 |
| 5,694,233 A | | 12/1997 | Wu et al. |
| 5,703,975 A | * | 12/1997 | Miller et al. .................. 385/16 |
| 5,852,505 A | * | 12/1998 | Li ................................. 398/58 |
| 5,938,811 A | | 8/1999 | Greene ......................... 65/385 |
| 6,130,971 A | | 10/2000 | Cao |
| 6,169,626 B1 | | 1/2001 | Chen et al. |
| 6,215,923 B1 | | 4/2001 | Li |
| 6,222,958 B1 | | 4/2001 | Paiam |
| 6,243,200 B1 | | 6/2001 | Zhou et al. |
| 6,268,951 B1 | | 7/2001 | Chen et al. |
| 6,275,322 B1 | | 8/2001 | Tai |
| 6,301,046 B1 | | 10/2001 | Tai et al. |
| 6,356,677 B1 | * | 3/2002 | Hall et al. ..................... 398/82 |
| 6,538,787 B1 | * | 3/2003 | Moeller et al. ............. 398/158 |
| 6,563,620 B1 | * | 5/2003 | Hakimi et al. .............. 398/141 |
| 6,580,534 B2 | * | 6/2003 | Madsen ........................ 398/63 |
| 6,684,002 B2 | * | 1/2004 | Xie et al. ..................... 385/15 |
| 6,741,813 B2 | * | 5/2004 | Su et al. ....................... 398/79 |

FOREIGN PATENT DOCUMENTS

| | | | |
|---|---|---|---|
| EP | 0 724 173 | 7/1996 | ........... G02B/6/34 |
| EP | 0 933 657 | 8/1999 | ........... G02B/6/293 |
| EP | 02 25 6408 | 7/2004 | |
| WO | WO 98/04942 | 2/1998 | ........... G02B/6/34 |

OTHER PUBLICATIONS

M. Kuznetsov, "Cascaded Coupler Mach–Zehnder Channel Dropping Filters for Wavelength–Division–Multiplexed Optical Systems," Journal of Lightwave Technology, vol. 12, No. 2, Feb. 1994, pp. 226–230.

(List continued on next page.)

*Primary Examiner*—M. R. Sedighian
*Assistant Examiner*—Chau M. Nguyen
(74) *Attorney, Agent, or Firm*—Karl D. Kovach

(57) ABSTRACT

Methods and apparatus for multiplexing and demultiplexing optical signals. An interleaver having a modified Mach-Zehnder interferometer as a first stage is used as a wavelength division multiplexer. This first stage is combined with one or more cascaded stages, each having a beam splitter and an optical delay element. A light beam including a number of signals at different wavelengths is received. The beam is split such that approximately half of each signal is contained in one of two sub-beams. One of the two sub-beams passes through a delay element, which provides a phase shift. The two sub-beams are recombined and split again. Each wavelength adds constructively or destructively in the new sub-beams such that the signals are separated—some wavelengths are in one of the new sub-beams, some are in the other. One of these sub-beams is delayed, and the two are combined and split again, improving the separation.

17 Claims, 23 Drawing Sheets

OTHER PUBLICATIONS

T. Chiba et al., "Novel architecture of wavelength interleving filter with Fourier transform–based MZIs" Optical Society of America 2000, paper #WB5–1, OFC 2001, Mar. 21, 2001, Anaheim, CA.

Cramer, John G., "The Alternate View," columns of John G. Cramer, Analog Science Fiction & Fact Magazine, Jun. 2000, downloaded from: http://www.npl.washington.edu/AV/altvw101.html on Jul. 16, 2001.

Harrison, David M., "Mach–Zehnder Interferometer," Analog Science Fiction & Fact Magazine, Mar. 16, 1999, downloaded from: http://www.upscale.utoronto.ca/GeneralInterest/Harrison/MachZehnder/MachZehnder.html on Jul. 14, 2001.

Chi–hung Huang et al., "Low–los Flat–top 50–GHz DWDM and Add–drop Modules using All–fiber Fourier Filters" National Fiber Optic Engineers Conference '00, Denver, Colorado, Aug. 2000.

Christi K. Madsen et al., "Optical Filter Design and Analysis A Signal Processing Approach", John Wiley & Sons, Inc., New York, 1999.

* cited by examiner

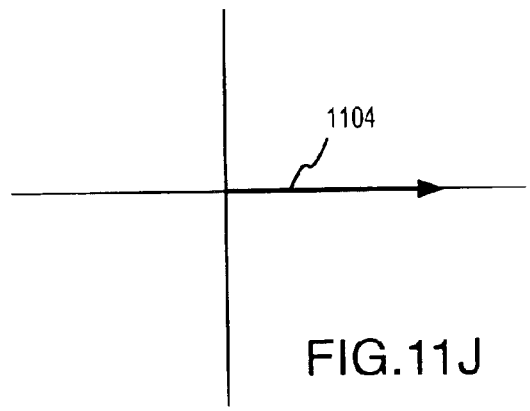
FIG.11J
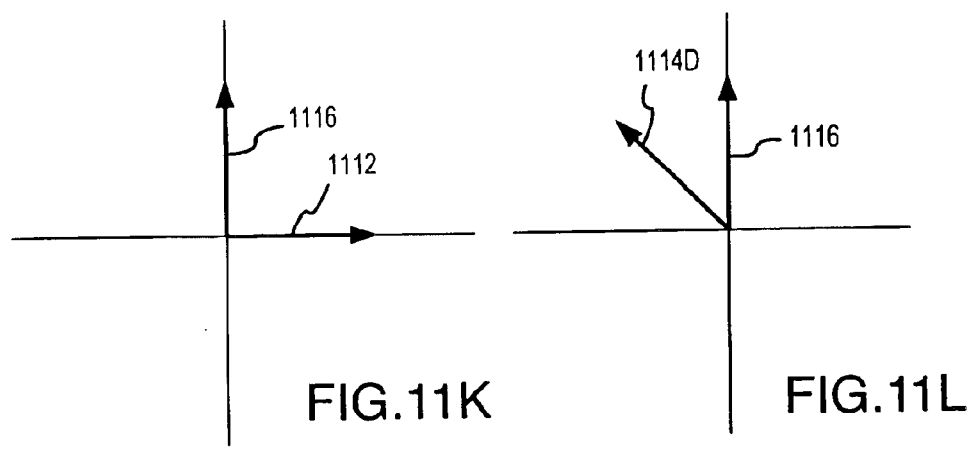
FIG.11K
FIG.11L
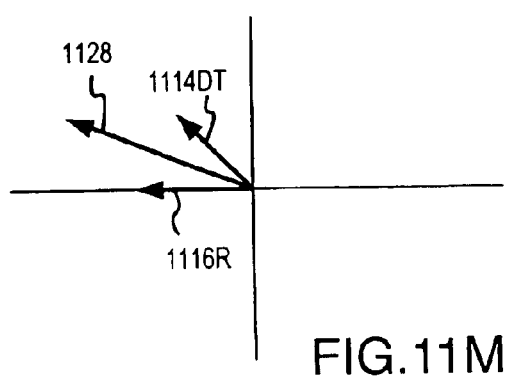
FIG.11M
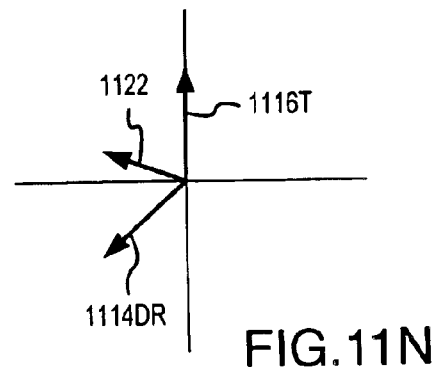
FIG.11N

| | |
|---|---|
| $E_{1004}=E_0$ | $A*e^{j\omega t}$ |
| $E_{1008}$ | $K1=sqrt(T1)$, where $T1$ is the transmittance of the first beam splitter<br>$K1*E_{1004}=K1*A*e^{j\omega t}$ |
| $E_{1006}$ | $K2=sqrt(1-T1)$<br>$K2*E_{1004}=K2*A*e^{j(\omega t + \pi/2)}$ |
| $E_{1014}$ | $E_{1008}*e^{j(\pi/2+2\pi L1/\lambda)}=K1*A*e^{j(\omega t + \pi/2 + 2\pi L1/\lambda)}$ |
| $E_{1016}$ | $E_{1006}*e^{j(\pi/2+2\pi L0/\lambda)}=K2*A*e^{j(\omega t + \pi + 2\pi L0/\lambda)}$ |
| $E_{1018}$ | $K3=sqrt(T2)$, where $T2$ is the transmittance of the 2nd beam splitter<br>$K4=sqrt(1-T2)$<br>$\Delta L1=L1-L0=(n-1)D_1$, where $L0$ is optical path length for sub-beam 1016, $L1$ for sub-beam 1014. $n$ and $D_1$ are the refractive index and thickness of the precision glass spacer 1070.<br><br>$K4*E_{1014}*e^{j\pi/2}+K3*E_{1016}$<br>$=A*(K1*K4*e^{j(\omega t + \pi + 2\pi L1/\lambda)} + K2*K3*e^{j(\omega t + \pi + 2\pi L0/\lambda)})$<br>$=A*e^{j(\omega t + \pi + 2\pi L0/\lambda)}*(K1*K4*e^{j(2\pi*\Delta L1/\lambda)} + K2*K3)$ |
| $E_{1024}$ | $K3*E_{1014}+K4*E_{1016}*e^{j\pi/2}$<br>$=K1*K3*A*e^{j(\omega t + \pi/2 + 2\pi L1/\lambda)} + K2*K4*A*e^{j(\omega t + 3\pi/2 + 2\pi L0/\lambda)}$<br>$=A*e^{j(\omega t + \pi/2 + 2\pi L0/\lambda)}*(K1*K3*e^{j(2\pi*\Delta L1/\lambda)} + K2*K4*e^{j\pi})$<br>$=A*e^{j(\omega t + \pi/2 + 2\pi L0/\lambda)}*(K1*K3*e^{j(2\pi*\Delta L1/\lambda)} - K2*K4)$ |
| $E_{1026}$ | $E_{1018}*e^{j(\pi/2+2\pi L3/\lambda)}$<br>$=A*e^{j(\omega t + \pi + 2\pi L0/\lambda)}*(K1*K4*e^{j(2\pi*\Delta L1/\lambda)} + K2*K3)*e^{j(\pi/2+2\pi L3/\lambda)}$ |
| $E_{1028}$ | $E_{1024}*e^{j(\pi/2+2\pi L2/\lambda)}$<br>$=A*e^{j(\omega t + \pi/2 + 2\pi L0/\lambda)}*(K1*K3*e^{j(2\pi*\Delta L1/\lambda)} - K2*K4)*e^{j(\pi/2+2\pi L2/\lambda)}$ |
| $E_{1032}$ | $K5=sqrt(T3)$, where $T3$ is the transmittance of the 3rd beam splitter<br>$K6=sqrt(1-T3)$<br>$\Delta L2=L3-L2=(n-1)D_2$, where $L2$ is optical path length for sub-beam 1028, $L3$ for sub-beam 1026. $n$ and $D_2$ are the refractive index and thickness of the precision glass spacer 1080.<br><br>$K6*E_{1026}*e^{j\pi/2} + K5*E_{1028}$<br>$= K6*A*e^{j(\omega t + \pi + 2\pi L0/\lambda)}*(K1*K4*e^{j(2\pi*\Delta L1/\lambda)} + K2*K3)*e^{j(\pi/2+2\pi L3/\lambda+\pi/2)}$<br>$+ K5*A*e^{j(\omega t + \pi/2 + 2\pi L0/\lambda)}*(K1*K3*e^{j(2\pi*\Delta L1/\lambda)} - K2*K4)*e^{j(\pi/2+2\pi L2/\lambda)}$<br>$=A*e^{j(\omega t + \pi + 2\pi L0/\lambda)}*e^{j2\pi L2/\lambda}*\{K6*(K1*K4*e^{j(2\pi*\Delta L1/\lambda)} + K2*K3)*e^{j(\pi+2\pi*\Delta L2/\lambda)}$<br>$+K5*(K1*K3*e^{j(2\pi*\Delta L1/\lambda)} - K2*K4)\}$<br>$= A*e^{j(\omega t + \pi + 2\pi L0/\lambda)}*e^{j2\pi L2/\lambda}*\{-K6*(K1*K4*e^{j(2\pi*\Delta L1/\lambda)} + K2*K3)*e^{j(2\pi*\Delta L2/\lambda)}$<br>$+K5*(K1*K3*e^{j(2\pi*\Delta L1/\lambda)} - K2*K4)\}$ |
| $E_{1034}$ | $K5*E_{1026}+ K6*E_{1028}*e^{j\pi/2}$<br>$= K5*A*e^{j(\omega t + \pi + 2\pi L0/\lambda)}*(K1*K4*e^{j(2\pi*\Delta L1/\lambda)} + K2*K3)*e^{j(\pi/2+2\pi L3/\lambda)}$<br>$+ K6*A*e^{j(\omega t + \pi/2 + 2\pi L0/\lambda)}*(K1*K3*e^{j(2\pi*\Delta L1/\lambda)} - K2*K4)*e^{j(\pi/2+2\pi L2/\lambda+\pi/2)}$ |

FIG.14A

| | |
|---|---|
| | $= A * e^{j(\omega t + 3\pi/2 + 2\pi L.0/\lambda)} * e^{j(2\pi L.2/\lambda)} * \{K5*(K1*K4*e^{j(2\pi\Delta L.1/\lambda)} + K2*K3)*e^{j(2\pi\Delta L.2/\lambda)}$<br>$+ K6*(K1*K3*e^{j(2\pi\Delta L.1/\lambda)} - K2*K4)\}$ |
| $E_{1038}$ | $= E_{1032} * e^{j(\pi/2 + 2\pi L.5/\lambda)}$<br>where L5 is optical path length for sub-beam 1038. |
| $E_{1042}$ | $= E_{1034} * e^{j(\pi/2 + 2\pi L.4/\lambda)}$<br>where L4 is optical path length for sub-beam 1042.<br>K7=sqrt(T4), where T4 is the transmittance of the 4th beam splitter<br>K8=sqrt(1-T4) |
| $E_{1044}$ | $E_{1044} = K8*E_{1038} * e^{j\pi/2} + K7*E_{1042}$ |
| $E_{1046}$ | $E_{1046} = K7*E_{1038} + K8*E_{1042} * e^{j\pi/2}$ |
| $I_{1044}$ | $= |E_{1044}|^2$ |
| $I_{1046}$ | $= |E_{1046}|^2$ |
| | |

FIG.14B

CASCADED OPTICAL MULTIPLEXER

BACKGROUND OF THE INVENTION

The present invention relates to wavelength division multiplexers (WDMs), particularly WDMs utilizing interferometric devices capable of channel separation, combination, and routing.

Wavelength division multiplexing is widely used in fiber optic communication systems to increase the transmission capacity of networks by allowing multiple carrier wavelengths, or channels, to be transmitted and received over a single optical fiber. In addition, WDMs can be used in fiber optic communication systems for other purposes, such as dispersion compensation, noise reduction, EFDA and Raman amplification, and gain flattening.

Optical wavelength division multiplexers receive two or more individual wavelengths (also referred to as colors or frequency channels) and combine them into one signal in a waveguide. Optical wavelength division demultiplexers receive an optical signal with two or more wavelengths from a waveguide and separate the optical signal into its component frequencies.

A wide variety of technologies are used to manufacture WDMs. Examples include dielectric thin film filters, fiber Bragg gratings, fused biconical tapers, and Arrayed Waveguide Gratings.

FIG. 1 is a diagram illustrating a prior art WDM using a conventional dielectric thin film filter. A multilayer interference film 100 is deposited on transparent substrate 110 to form a narrow bandpass filter. Collimated light 120 carrying a plurality of wavelengths $\lambda_1$–$\lambda_n$ is incident on film 100. Optical conditions determined by the characteristics of film 100 allow only light 140 having wavelength $\lambda_k$ to pass through, while the other wavelengths are reflected. Cascading these thin film filters can make a WDM capable of separating more than one wavelength. With increasing channel counts, filters are cascaded serially to separate the channels. Insertion losses accumulate in the WDM, which attenuates channels at the end of the filter chain and causes nonuniform losses among the channels. In addition, with current thin film technology, the channel spacing for practical purposes is limited to greater than 200 GHz (1.6 mn at 1550 nm), which limits the channel capacity of fiber optical network systems.

FIG. 2 is a diagram representing a conventional fiber Bragg grating. A fiber Bragg grating is fabricated by inscribing Bragg gratings directly into a photosensitive fiber core using UV light and photomasking. With proper design, a fiber Bragg grating 200 reflects the selected wavelength while transmitting other wavelengths. A circulator 210 is typically used to extract the reflected wavelength. Circulators tend to be very expensive. Alternately, a fiber Mach-Zehnder interferometer (MZI) can be used. In the past MZIs have been difficult to align and keep aligned in the presence of temperature variations and vibrations. Furthermore, since fiber Bragg gratings only filter out one wavelength at a time, they must be cascaded in a serial fashion to separate channels. As with thin film filters, insertion losses accumulate in the WDM, which attenuates channels at the end of the filter chain and causes nonuniform losses among the channels.

FIG. 3 is a diagram showing a conventional single-mode fused biconical taper (FBT) fiber coupler that can also be used to form WDMs. Typically, two single-mode optical fibers are fused together and elongated to reduce the core size, which enlarges the mode size and moves the two fiber cores closer to form a fused fiber coupler 300. Signals of two different wavelengths, for example 1310 nm and 1550 nm, enter the input terminal 310 and are separated into the first and second fibers 330 and 340 of the output terminal. The coupling ratios for the two channels exhibit complementary sinusoidal behavior for amplitude as a function of frequency within the passband of the WDM, with each channel having one or more peaks or windows within the passband. Unfortunately, the FBT coupler is only suited for separating channels whose wavelengths are relatively far apart. To achieve the multi-window WDMs or small channel spacing, it is necessary to significantly increase the length of the fused and tapered region, which has presented significant difficulties in manufacturing.

FIG. 4 is a diagram illustrating a conventional arrayed waveguide grating (AWG) 400 capable of splitting wavelength-multiplexed light. Light 410 including a plurality of different wavelengths enters the receiving end of the AWG 420 and is divided into a number of waveguides 430 each having different optical path lengths. At the end of the grating array 440, optical signals with different phase shifts caused by difference in the path length are recombined. When recombined, they interfere with each other to form outputs in different directions for different wavelengths. The spread signals are coupled into output ports 450. AWGs are manufactured using semiconductor photolithographic technologies. Although AWGs offer improved uniformity in insertion losses among channels, the insertion loss is generally high, often 5–7 dB. Moreover, AWGs typically suffer from high cross talk. In an AWG, the complexity and size of the device increases with increasing channel counts and decreasing channel spacing. The performance of AWGs is also temperature sensitive.

A filter for WDM applications should have a response curve as a function of wavelength that has a flat passband with steep skirts, what is descriptively known as a "brick-wall" or "boxcar" filter. A flat passband allows light within a tolerance of a desired wavelength to pass, and the steep skirts reduce the amount of out-of-band energy that passes, thus reducing cross talk.

FIG. 5 shows a sample spectrum 510 for a device with a narrow pass band 530 and a narrow stop band 540. For WDM optical networks, narrow pass and stop bands are problematic due to the physical limitations and temperature sensitivity of the signal transmitting laser devices. For example, the wavelength of light transmitted by a laser may not be exactly centered on a desired value. The amount that a wavelength is off center is referred to as offset. This offset is typically influenced by temperature. The amount of wavelength drift from the laser should not exceed the width of the pass band, otherwise a high insertion loss and a large amount of cross talk from neighboring channels occurs. Since it is difficult and expensive to produce lasers with high wavelength precision and stability, a wide passband is desirable. A brick-wall characteristic widens the passband while maintaining good out-of-band rejection.

Therefore, it is desirable to have a WDM with brick-wall filtering characteristics so as to allow high tolerance for wavelength offset and drift, and to reduce cross talk. The WDM should also be cost effective to manufacture, so it should be easy to align. The design should be such that losses do not accumulate, and insertion losses should be low.

SUMMARY OF THE INVENTION

According to the invention, an interleaver for WDM applications is provided having a near flat pass-band and good stop-band characteristics, which is operative to demultiplex odd and even channels on a single waveguide, and provide the channels as separate outputs. A modified Mach-Zehnder interferometer is used as a first stage and is cascaded with one or more further stages, each including a delay element and a beam splitter or optical coupler. At each stage of the interleaver, light is split into two sub-beams. One sub-beam is delayed relative to the other, and the two are recombined and split again. Individual wavelengths interfere constructively or destructively in the new sub-beams, such that the odd and even channels separate, even channels in one sub-beam, odd channels in the other. The new sub-beams are directed either to a following stage or to an output.

A WDM interleaver in accordance with the present invention provides a high tolerance to wavelength drift, insensitivity to temperature and other environmental changes, and is easy to align, fabricate, and package. Insertion losses are low, and the cascading of stages does not accumulate losses. Mechanisms that precisely adjust an interleaver's center wavelength and output spectrum shape are also provided.

One exemplary embodiment of the present invention provides a method of demultiplexing a first optical signal at a first wavelength of light from a second optical signal at a second wavelength of light. The method includes providing a light beam with the first signal at first wavelength of light and the second signal at second wavelength of light. The light beam is split into a first sub-beam and a second sub-beam, and the second sub-beam is delayed by a first length of time—or duration. The first sub-beam and the delayed second sub-beam are combined and split again into a third sub-beam and a fourth sub-beam. The fourth sub-beam is delayed by a second duration. The third sub-beam and the delayed fourth sub-beam are combined and split again into a fifth sub-beam and a sixth sub-beam. A substantial majority of the first optical signal is contained in the fifth sub-beam, and a substantial majority of the second optical signal is in the sixth sub-beam.

Another exemplary embodiment of the present invention provides a method of demultiplexing a first optical signal and a second optical signal. This method includes providing a light beam with the first optical signal and the second optical signal. A first portion of the light beam is reflected to create a first sub-beam, and a second portion of the light beam is transmitted to create a second sub-beam. The second sub-beam is delayed by a first duration. A first portion of the first sub-beam is reflected, a second portion of the first sub-beam is transmitted, a first portion of the delayed second sub-beam is reflected, and a second portion of the delayed second sub-beam is transmitted. The reflected first portion of the first sub-beam is combined with the transmitted second portion of the delayed second sub-beam to form a third sub-beam, while the reflected first portion of the delayed second sub-beam is combined with the second transmitted portion of the first sub-beam to form a fourth sub-beam. The fourth sub-beam is delayed a second duration. A first portion of the third sub-beam is reflected, a second portion of the third sub-beam is transmitted, a first portion of the delayed fourth sub-beam is reflected, and a second portion of the delayed fourth sub-beam transmitted. The reflected first portion of the third sub-beam is combined with the transmitted second portion of the delayed fourth sub-beam to form a fifth sub-beam, and the reflected first portion of the delayed fourth sub-beam is combined with the transmitted second portion of the third sub-beam to form a sixth sub-beam. A substantial majority of the first optical signal is contained in the fifth sub-beam, and a substantial majority of the second optical signal is in the sixth sub-beam.

A better understanding of the nature and advantages of the present invention may be gained with reference to the following detailed description and the accompanying drawings.

BRIEF DESCRIPTION OF THE DRAWINGS

FIGS. 14A and 14B list mathematical equations for the amplitude and phase of light as a function of wavelength for the interleaver in FIG. 10;

DESCRIPTION OF SPECIFIC EMBODIMENTS

An embodiment of the present invention uses an interleaver as a WDM. An interleaver is a wavelength-filtering device that separates the even and odd channels of a WDM signal into two output signals.

Figure 1:
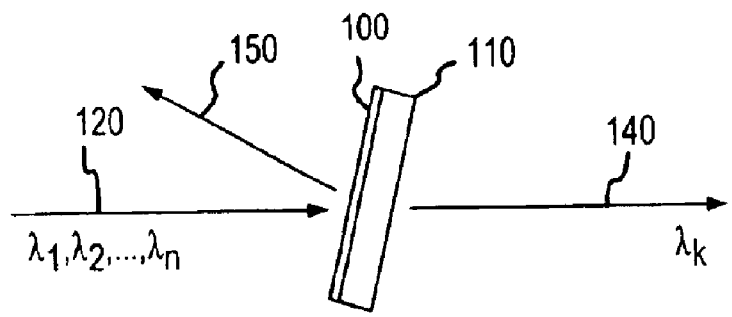
FIG. 1 illustrates a prior art WDM using a conventional dielectric thin film filter.
Figure 2:
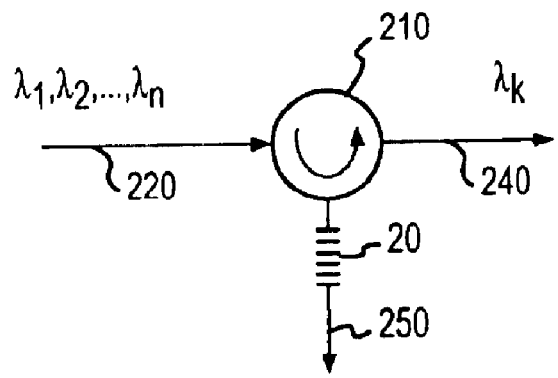
FIG. 2 represents a conventional prior art fiber Bragg grating.
Figure 3:
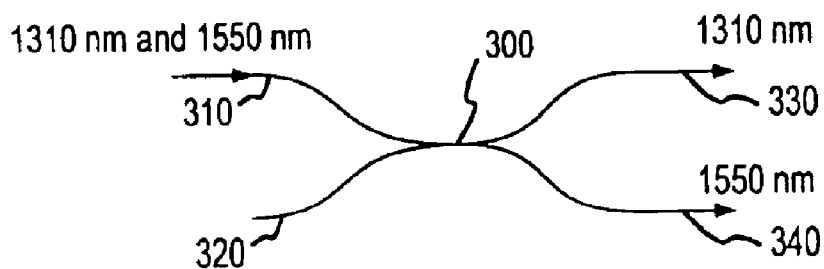
FIG. 3 shows a conventional prior art single-mode fused biconical taper fiber coupler that can be used as a WDM.
Figure 4:
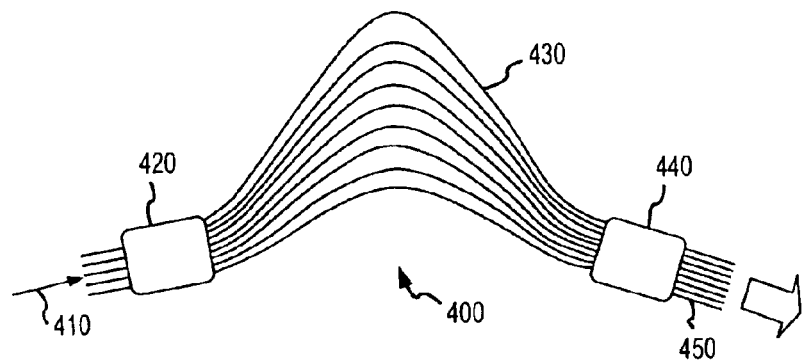
FIG. 4 illustrates a conventional prior art arrayed waveguide grating for splitting a wavelength multiplexed light.
Figure 5:
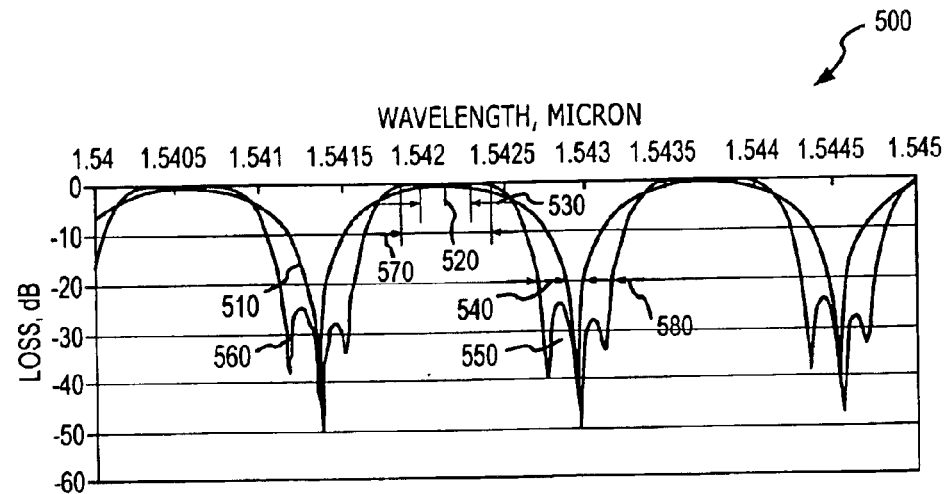
FIG. 5 is a spectrum curve for a device with narrow pass and stop bands.
Figure 6:
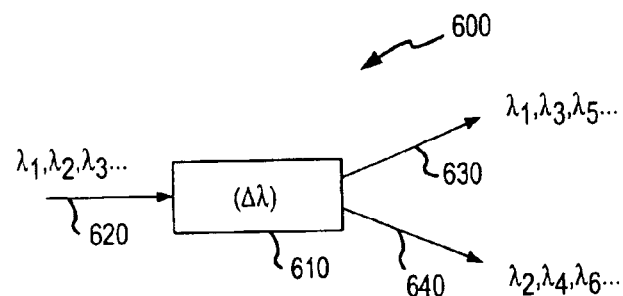
FIG. 6 is a block diagram of an interleaver consistent with an embodiment of the present invention.

FIG. 6 is a block diagram of an interleaver consistent with an embodiment of the present invention. An input signal 620 including channels, $\lambda_1, \lambda_2, \ldots, \lambda_n$, having channel spacing $\Delta\lambda$ enters an input port of a interleaver 610 and is separated into output signal streams 630, which includes the odd channels, and 640, which includes the even channels. Both output signal streams have a channel spacing 2·$\Delta\lambda$. As will be seen below, the interleavers can be cascaded to further enlarge the channel spacing to 4·$\Delta\lambda$ or 6·$\Delta\lambda$. This block diagram, as with all the included figures, is shown for illustrative purposes only, and does not limit either the possible applications of embodiments of the present invention, or the claims.

One embodiment of the present invention provides an interleaver for WDM applications having modified unbalanced Mach-Zehnder interferometers (MZIs) cascaded in a serial lattice configuration. The signal-carrying-light beam is split, recombined and interfered multiple times, thus generating near-boxcar-shaped spectrum characteristics at the two output ports.

Figure 7:
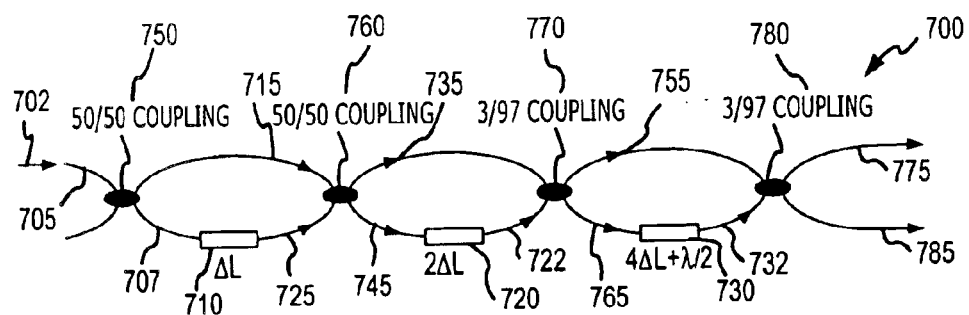
FIG. 7 illustrates one configuration of a WDM interleaver consistent with an embodiment of the present invention.
Figure 8A:
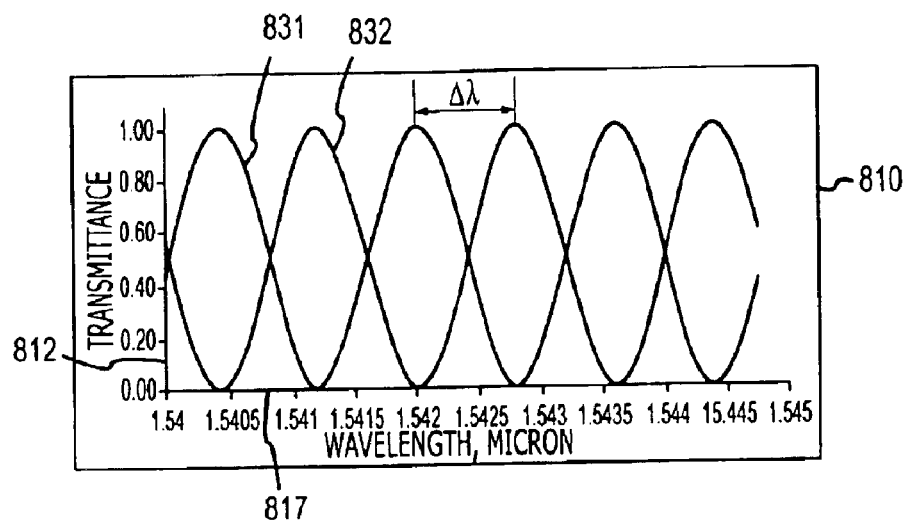
FIGS. 8A to 8C illustrate the transmission spectra at different stages of the interleaver of FIG. 7.

FIG. 7 illustrates one configuration of a WDM interleaver consistent with an embodiment of the present invention. Collimated light 702, including of a plurality of optical wavelengths or channels, enters an input port 705 of the interleaver 700 and is split approximately 50/50 at the coupler or beam splitter 750 into two lights 715 and 707, which enter the first interleaver stage. Phase shift element 710 introduces an optical path difference of length $\Delta L$ between the two light beams 715 and 707. The two light beams interfere with each other constructively or destructively, depending on the wavelength of the light, when recombined at a second 50/50 coupler 760. Lights 735 and 745 have complementary sinusoidal spectrum curves as a function of wavelength. These curves are shown in FIG. 8A as waveforms 831 and 832. Light beam 745 is delayed approximately 2$\Delta L$ by phase shift element 720, generating beam 722. A third coupler 770, which has a coupling ratio of approximately 3/97, combines the two light beams 735 and 722. In a 3/97 coupler, approximately 3 percent of incident light is reflected, while approximately 97 percent is transmitted. Light beams 755 and 765 have noticeably near-boxcar-shaped spectrum characteristics that are shown as waveforms 841 and 842 in FIG. 8B. Light beam 765 is delayed approximately 4$\Delta L$ by phase shift element 730, generating beam 732. In a specific embodiment, the delay is approximately 4$\Delta L$+$\lambda$/2, where $\lambda$ is a wavelength of light being used. In this embodiment, the wavelengths used are very close to one another, so any of their wavelengths $\lambda$ can be used. A fourth coupler 780, which also has a coupling ratio of approximately 3/97, combines the two light beams 755 and 730. Output light beams 775 and 785 have the desired near-boxcar-shaped spectrum characteristics that are shown as waveforms 851 and 852 in FIG. 8C.

In a specific embodiment of the present invention, the 50/50 couplers 750 and 760 are substantially nonpolarizing for the wavelengths of interest. Each 50/50 coupler reflects approximately 50 percent and transmits approximately 50 percent of an incident beam for the wavelengths of interest. For example, in a specific embodiment, approximately 45 to 55 percent of an incident beam is reflected, and the remaining portion (55 to 45 percent) is transmitted. In other embodiments, the beam splitting ratio tolerance may be even greater.

Furthermore, in a specific embodiment, two 3/97 couplers 770 and 780 are substantially nonpolarizing for the wavelengths of interest. Again, each 3/97 coupler reflects approximately 3 percent and transmits approximately 97 percent of an incident beam for the wavelengths of interest. For example, in a specific embodiment, approximately 2 to 5 percent of an incident beam is reflected, and the remaining portion (98 to 95 percent) is transmitted. In other embodiments, the beam splitting ratio tolerance may be even greater. In other embodiments other couplers may be used. For example, a 97/3 coupler with similar tolerances may be used in place of coupler 770 or 780, so long as the phase shift element in the stage before the coupler is moved to the other leg of that interleaver stage.

Figure 8B:
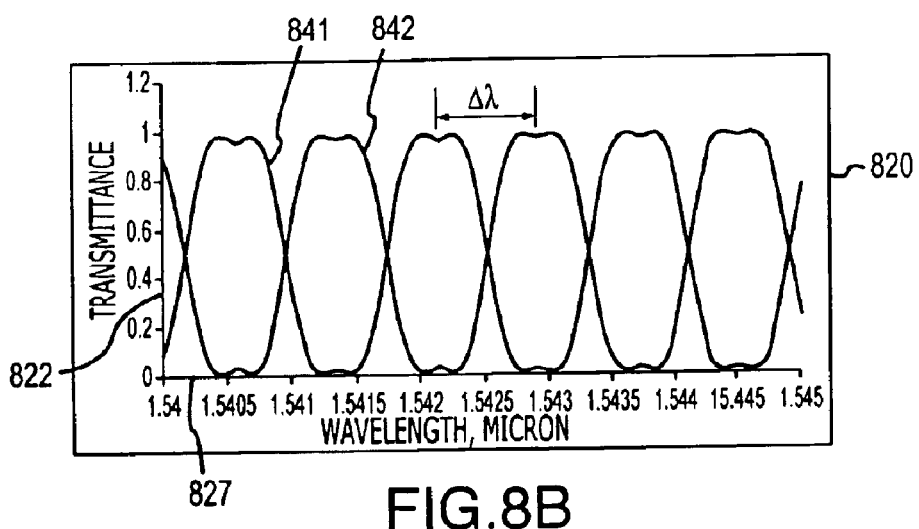
Figure 8C:
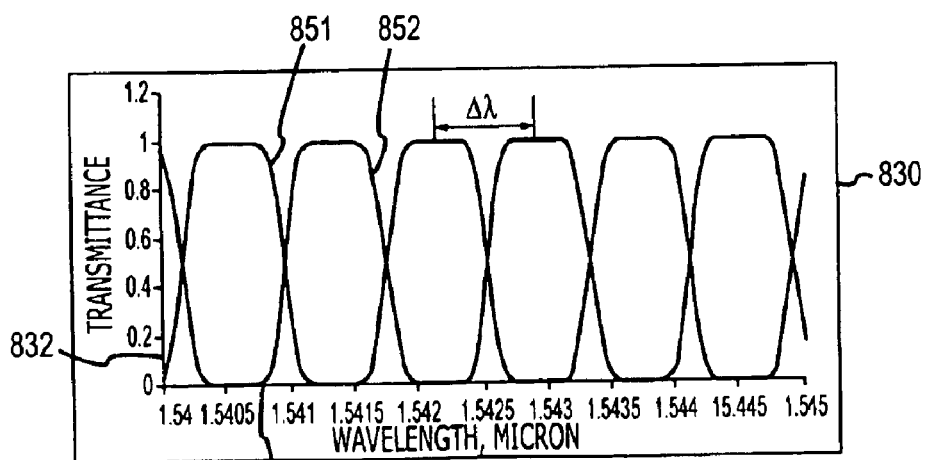

FIGS. 8A to 8C illustrate the transmission spectra at different stages of the interleaver of FIG. 7. These waveforms are characterized by alternating peaks and nulls. The channel spacing $\Delta\lambda$ of the interleaver, defined as the wavelength separation between the transmission peak wavelengths of two adjacent channels, as shown in FIG. 8A, can be expressed as follows:

$$\Delta\lambda = \frac{\lambda^2}{2 \cdot \Delta L},$$

where $\lambda$ is the central wavelength and $\Delta L$ is the optical path difference between the two MZI legs. The wavelength separation or combination capability of an interleaver depends on the number of windows, or peaks, and the window spacing.

One embodiment of the present invention uses nonpolarizing beam-splitting prisms and precision optical spacers to construct a WDM interleaver based on the above principles. This design offers the advantages of ease of manufacturing, assembly, and alignment.

Figure 9:
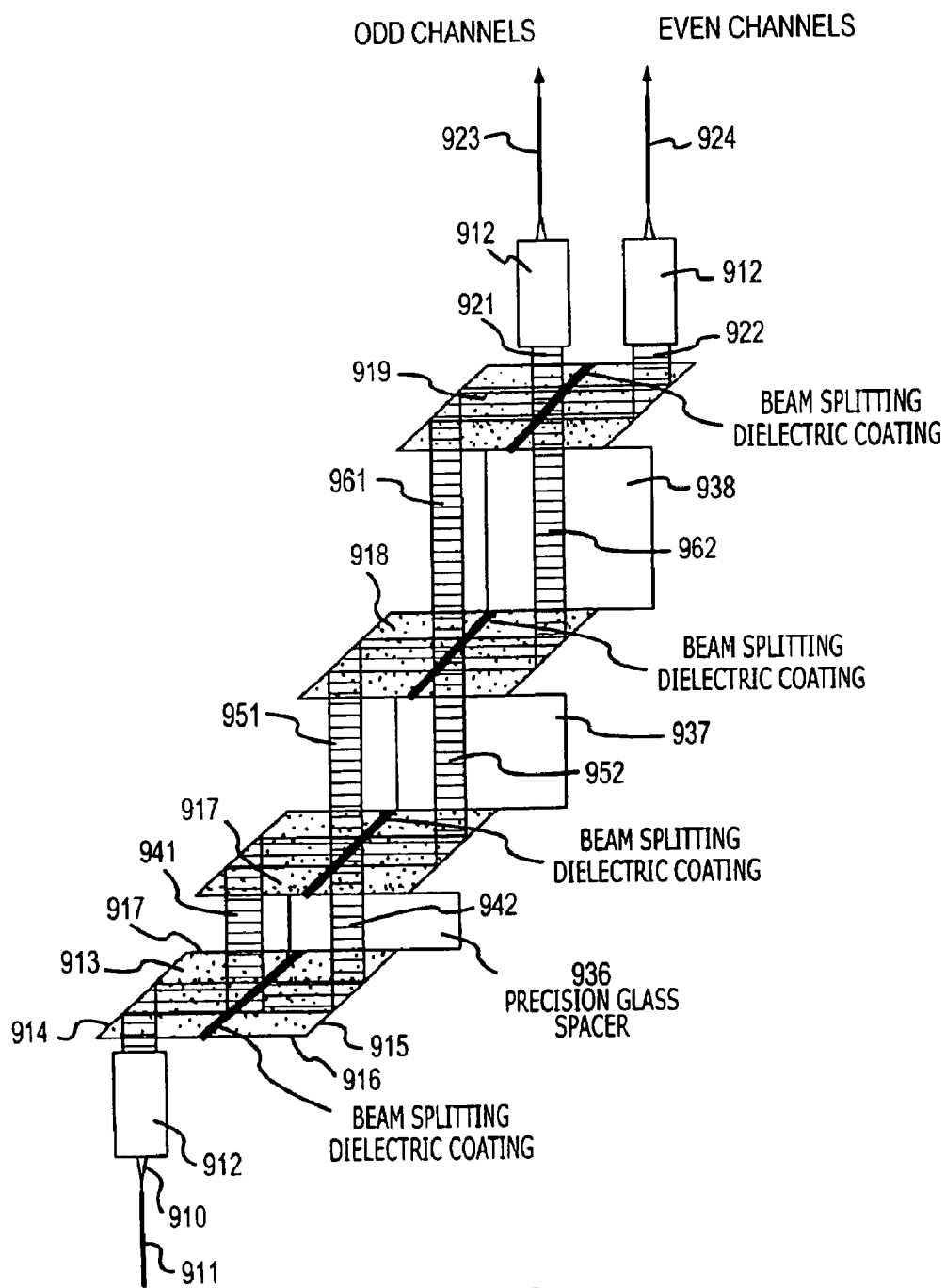
FIG. 9 shows the construction of an interleaver consistent with one embodiment of the present invention.

FIG. 9 shows the physical construction of such an interleaver. Included are prisms 913, 917, 918, and 919, precision glass spacers 936, 937, and 938, optical lenses 912, fiber optic input line 911, and fiber optic output lines 923 and 924. Each prism 913, 917, 918, and 919 is made up of two smaller prisms, or sub-prisms.

Light 910 includes a plurality of wavelengths. It exits optical fiber 911, and is collimated by optical lens 912. The collimated light beam enters the first nonpolarizing 50/50 beam-splitting prism 913 and splits into two light beams 941 and 942. After a precision glass or quartz spacer 936 in one of the two beams introduces an optical path difference, the second 50/50 beam splitter 917 combines and splits them again. This combining and splitting is repeated twice more at 3/97 beam-splitters. Each beam splitting ratio and optical path difference is determined such that an optimum filter characteristic is generated. Two light beams 921 and 922, including the odd and even channels, exit the interleaver and are coupled into two receiving fibers 923 and 924 after being collimated by optical lenses 912. Other embodiments are readily envisioned which use different beam splitters, have different optical phase shifts, have phase shift elements in different paths, and have a different number of stages. For example, an interleaver consistent with the present invention may have two or four stages.

Each prism has surfaces, for example 914 and 915 of prism 913, which provide approximately a total internal reflection (TIR) of an incident beam. These surfaces may be polished and coated with a scratch protection to prevent abrasions that would cause scattering. Other surfaces, for example 916 and 917 of prism 913, may be polished and coated with an anti-reflective coating. The interface of each sub-prism may be polished and coated with a beam-splitting thin-film dielectric or other beam-splitting coating. In a specific embodiment, each prism is made of fused silica. In other embodiments, other optical glass or material may be used that is substantially transparent or has a high transmission in the wavelengths of light being used. The prisms may alternately be made of quartz, BK-7, FK-51, FK-52, or other glass. (BK-7, FK-51, and FK-52 may be alternately written as BK7, FK51, and FK52, and are available from Schott Glass Technologies, 400 York Avenue, Duryea, Pa., 18642.) In other embodiments, prisms are not used. For example, fiber optic cables of a selected length may be used.

Again, the 50/50 and 3/97 beam splitters may be substantially nonpolarizing for the wavelengths of interest. Also, there are tolerances associated with 50/50 and 3/97 ratios. For example, the reflection/transmission ratios may be anywhere from approximately 45/55 to 55/45 and 2/98 to 5/95.

This design is suited for WDMs with a smaller channel spacing and consequently larger optical path difference. Precision glass or quartz spacers are used to set the optical path difference. In one embodiment, the spacers are made from the same highly transparent optical glass as the prisms and plates. The thickness of the spacer should be fabricated with submicron accuracy to allow the interleavers to function properly. The optical path difference ΔL is determined by:

$$\Delta L = (n_{glass} - 1) \cdot D$$

Where $n_{glass}$ is the refractive index of the glass and D is the physical thickness of the precision glass spacer. From this equation, it is apparent that the refractive index of the glass is preferably precisely monitored to ensure accurate optical path length differences.

It is important that an interleaver has minimum sensitivity to environmental changes, such as variations in temperature. The temperature sensitivity of the optical path length is dependent on the thermal expansion coefficient (α) and temperature coefficient (dn/dT) of the optical glass. The temperature sensitivity can be found by:

$$\frac{d(\Delta L)}{dT} = \frac{d(n_{glass}-1)}{dT} D + (n_{glass}-1)\frac{dD}{dT} = D\left(\frac{dn_{glass}}{dT} + \alpha \cdot (n_{glass}-1)\right)$$

If fused silica is used, one embodiment of the present invention has a temperature sensitivity of about 0.037 nm/° C. for its center wavelength drift. If BK-7 glass is used, the center wavelength drift can be reduced to about 0.017 nm/° C. If FK-51 or FK-52 glass is used, the drift can be further reduced to less than 0.002 nm/° C. Alternately, quartz may be used. By carefully selecting the optical glass, the temperature sensitivity can be reduced to achieve a nearly temperature independent performance.

In a specific embodiment, spacer or delay element 936 has a length in the direction of propagation of beam 942 approximately equal to 1800λ. For wave lengths in the 1.54 micron range, the length is about 2.77 mm. In this embodiment, spacer 937 is made up of two spacers of this length, and four are used to make spacer 938. For spacer 938 one of the four individual spacers is an extra λ/2 in length. Alternately, one spacer that is approximately 3600 wavelengths long may be used for spacer 937, and one spacer that is approximately 7200.5 wavelengths long may be used for spacer 938.

These components, the prisms and spacers, are typically mounted on a surface using an adhesive. In a specific embodiment, a silica based epoxy having a thermal characteristics is used. The surface may be glass, such as fused silica, BK-7, FK-51, FK-52, or other glass. Alternately, the surface may be quartz, metal, Invar, Kovar, silicon, or other material with low thermal expansion characteristics. The surface may be part of, or enclosed in, an enclosure or case.

Figure 10:
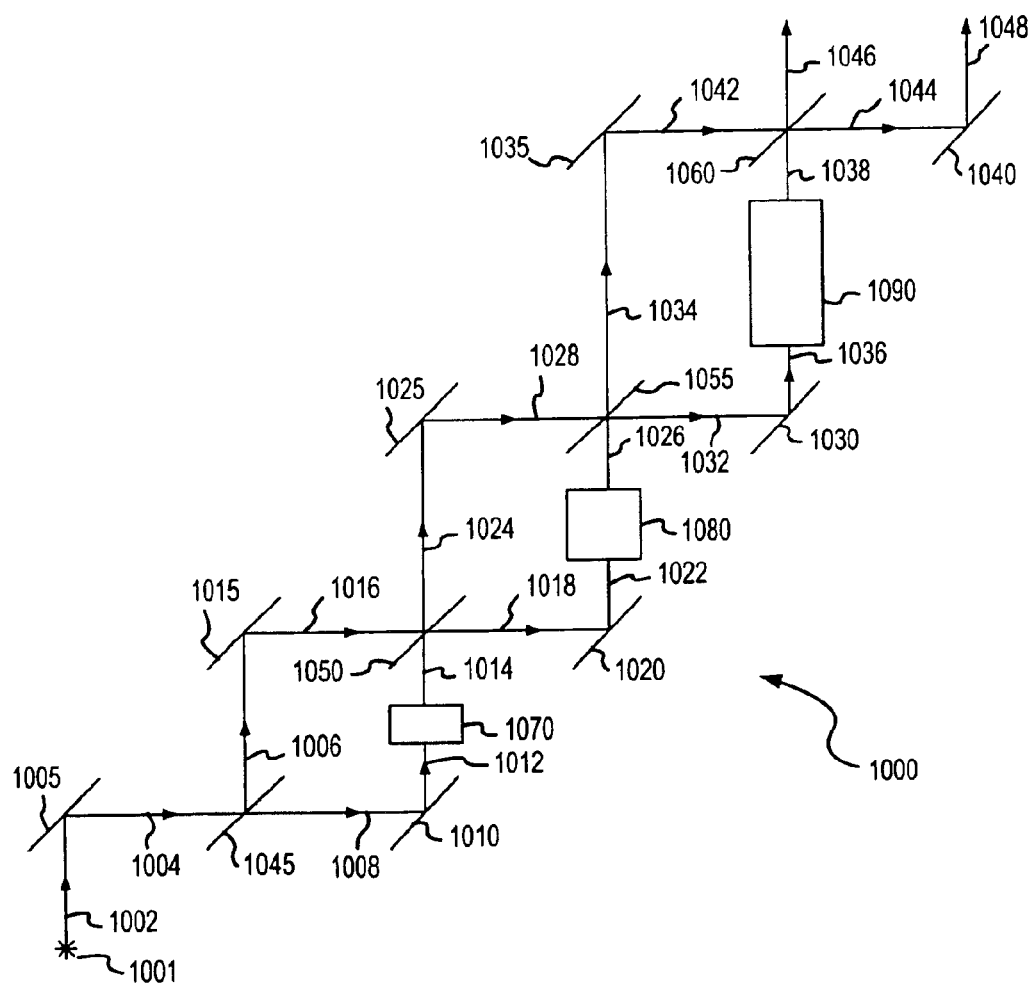
FIG. 10 is a symbolic representation of an interleaver consistent with an embodiment of the present invention.

FIG. 10 is a symbolic representation of an interleaver consistent with an embodiment of the present invention, such as FIG. 9. Included are reflective surfaces 1005, 1010, 1015, 1020, 1025, 1030, 1035, and 1040, optical phase shift elements 1070, 1080, and 1090, and beam-splitters 1045, 1050, 1055, and 1060. Each pair of reflective surfaces, along with their associated beam-splitter, may be part of a prism, as shown in FIG. 9. For example, reflective surface 1005 may be a left face of a prism, while reflective surface 1010 may be a right face of a prism. The reflective surfaces are positioned such that there is approximately a total internal reflection of an incident light beam. Again, these surfaces may be polished and covered with scratch protection to avoid abrasions which would cause scattering. In other embodiments, the reflective surface may be a mirror or mirrored surface. Beam splitter 1045 may be a dielectric thin film coating at the interface of two sub-prisms that form the larger prism. In this way, the interleaver 1000 can be comprised of 4 prisms (or 8 sub-prisms) and three glass spacers.

Input light source 1001 provides optical signal 1002. This input light source typically includes multiple input signals, where each input light signal has a different wavelength. Reflective surface 1005 reflects optical signal 1002, resulting in optical signal 1004. Optical signal 1004 is incident to beam splitter 1045. Beam splitter 1045 passes a portion of the optical signal 1004 as optical signal 1008, and reflects a portion of the optical signal 1004 as optical signal 1006. In one embodiment, beam splitter 1045 splits the beam approximately 50/50. In that case, half of the optical signal 1004 for is transmitted and half is reflected. In a specific embodiment, beam splitter 1045 is substantially nonpolarizing and retains approximately a 50/50 split ratio over a sufficiently wide range of wavelengths. There are tolerances associated with this ratio, for example the ratio may be approximately in the range of 45/55 to 55/45 percent.

Reflective surface 1010 is positioned such that it provides approximately a total internal reflection of optical signal 1008, resulting in optical signal 1012, which is phase shifted by phase shift element 1070, resulting in optical signal 1014. Reflective surface 1015 reflects optical signal 1006, resulting in optical signal 1016. Beam splitter 1050 combines and resplits optical signals 1014 and 1016. Specifically, a portion of optical signal 1016 is reflected and a portion of optical signal 1014 is transmitted by beam splitter 1050, and these are added together to generate optical signal 1024. Also, a portion of optical signal 1016 is passed and a portion of optical signal 1014 is reflected by beam splitter 1050, and they are added together to generate optical signal 1018. In one embodiment of the present invention, beam splitter 1050 splits an incident beam in approximately a 50/50 ratio, and is substantially nonpolarizing. Again, there are tolerances associated with the split ratio, for example, the ratio may be approximately in the range of 45/55 to 55/45 percent. In other embodiments, other ratios may be used for these beam splitters.

Reflective surface 1020 reflects optical signal 1018, resulting in optical signal 1022, which is phase shifted by phase shift element 1080, resulting in optical signal 1026. In one embodiment of the present invention phase shift element 1080 provides twice the optical phase shift as element 1070. Reflective surface 1025 reflects optical signal 1024, resulting in optical signal 1028. In other embodiments, the phase shift may be a different value. Beam splitter 1055 combines and resplits optical signals 1028 and 1026. Specifically, a portion of optical signal 1028 is reflected and a portion of optical signal 1026 is transmitted by beam splitter 1055, and they are added together to generate optical signal 1034. Also, a portion of optical signal 1028 is passed and a portion of optical signal 1026 is reflected by beam splitter 1055, and these are added together to generate optical signal 1032. In one embodiment of the present invention, beam splitter 1055 is substantially nonpolarizing, reflects approximately 3 percent, and transmits approximately 97 percent of an incident beam. In a specific embodiment, a beam splitter where the reflection/transmission ratio is in approximately in the range of 2/98 to 5/95 is used.

Reflective surface 1030 reflects optical signal 1032, resulting in optical signal 1036, which is phase shifted by phase shift element 1090, resulting in optical signal 1038. In one embodiment of the present invention, phase shift element 1090 provides four times the phase shift of element 1070, plus one half a wavelength. Reflective surface 1035 reflects optical signal 1034, resulting in optical signal 1042. Beam splitter 1060 combines and resplits optical signals 1048 and 1038. Specifically, a portion of optical signal 1042 is reflected and a portion of optical signal 1038 is transmitted by beam splitter 1060. These portions are added together to generate output optical signal 1046. Also, a portion of optical signal 1042 is transmitted and a portion of optical signal 1038 is reflected by beam splitter 1060. In a specific embodiment, this beam splitter has a reflection/transmission ratio approximately in the range of 2/98 to 5/95, and is substantially nonpolarizing. These portions are added together to generate optical signal 1045. Reflective surface 1040 reflects optical signal 1045, resulting in output optical signal 1048.

Figure 11A:
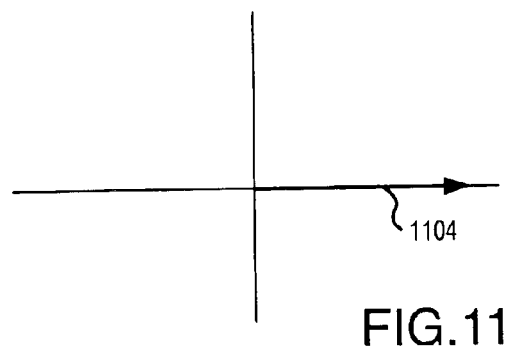
FIGS. 11A though 11V are vector representations of the amplitude and phase of light at a wavelength at different points of the interleaver in FIG. 10.
Figure 11B:
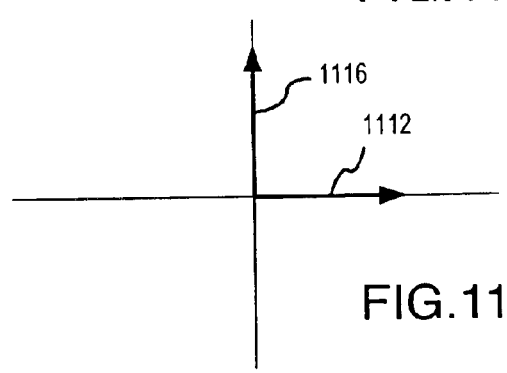
Figure 11C:
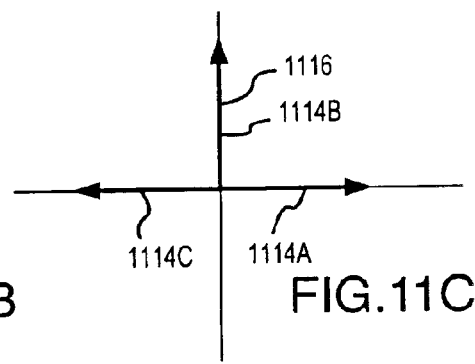
Figure 11D:
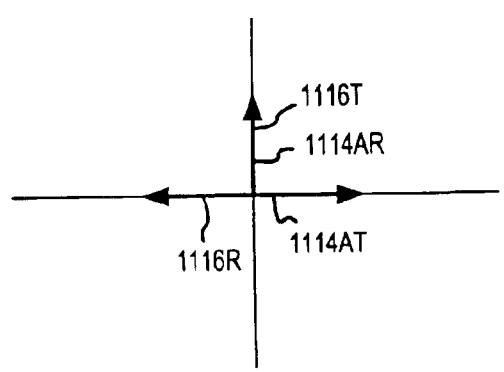
Figure 11E:
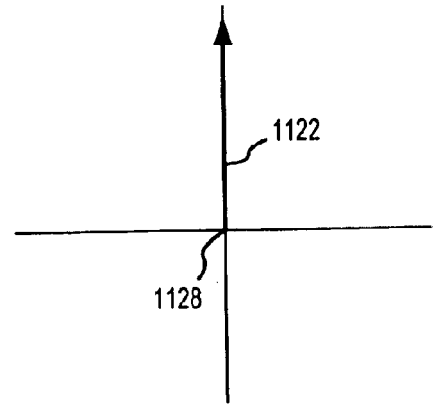
Figure 11F:
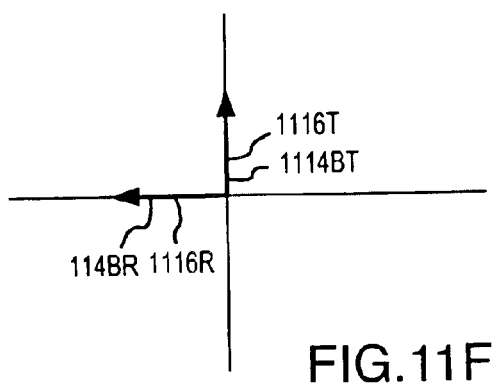
Figure 11G:
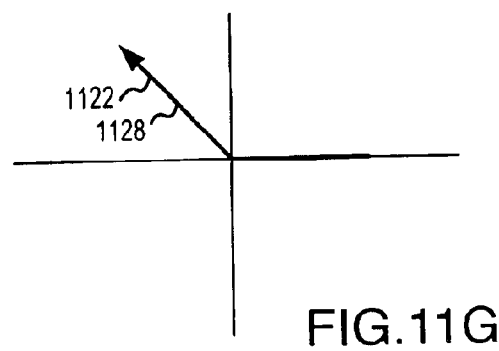
Figure 11H:
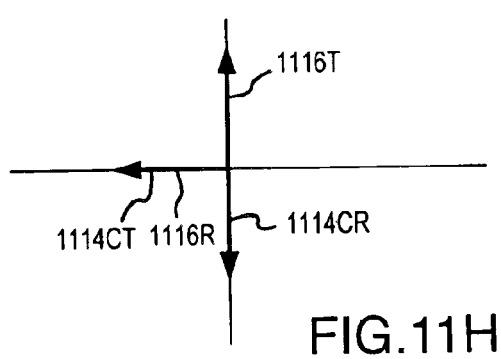
Figure 11I:
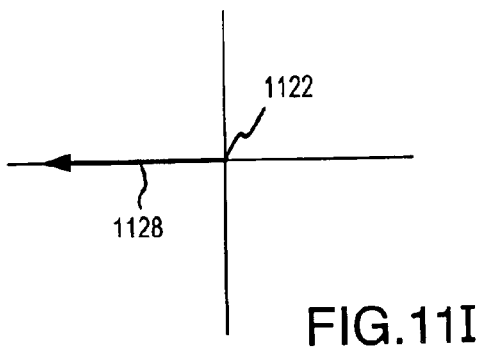
Figure 11O:
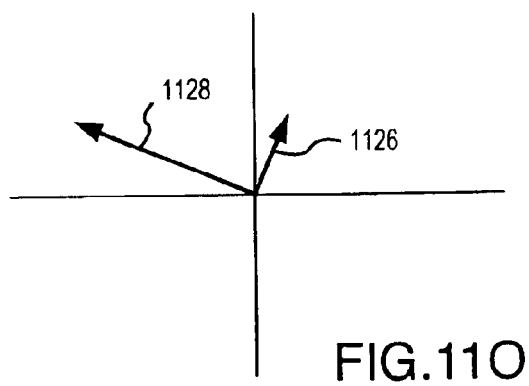
Figure 11P:
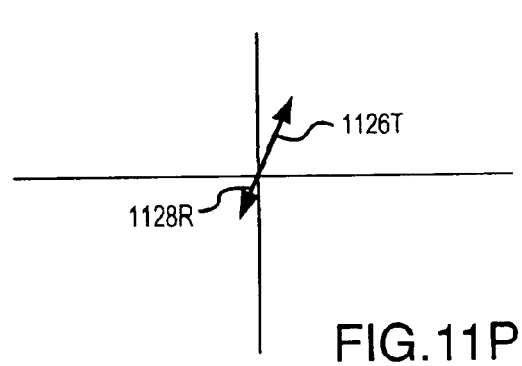
Figure 11Q:
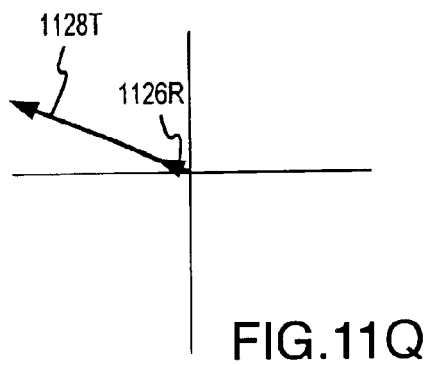
Figure 11R:
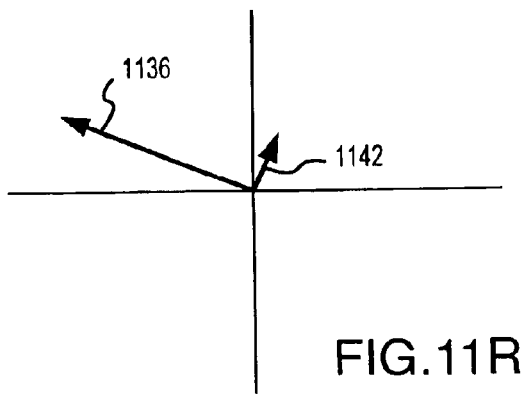
Figure 11S:
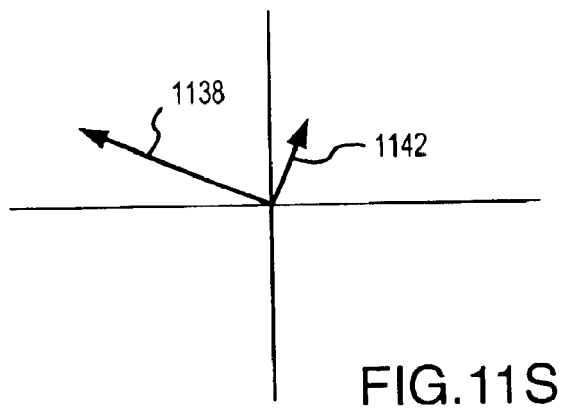
Figure 11T:
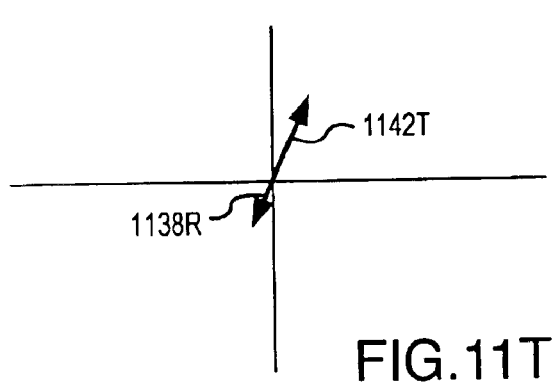
Figure 11U:
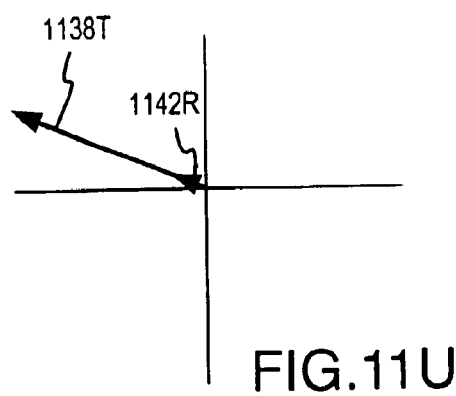
Figure 11V:
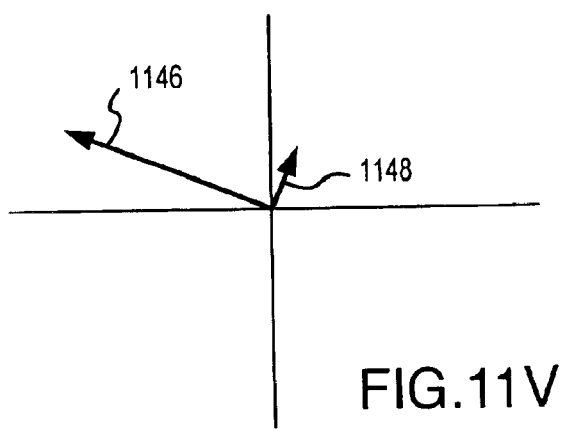

FIGS. 11A through 11V are vector representations showing the amplitude and phase of light at a wavelength for different points in FIG. 10. For the sake of simplicity, each 90-degree phase shift associated with reflective surfaces 1005, 1010, 1015, 1020, 1025, 1030, 1035, and 1040 is ignored. This is reasonable since each path is reflected once, resulting in a zero differential phase change. Also, some embodiments may not use reflective surfaces or mirrors, and instead use current fiber-optic waveguides, as one example. Also for the sake of simplicity, the only distance related phase shift that is accounted for are the optical path elements 1070, 1080, and 1090. In other words, these elements are treated as optical path phase shift differences.

FIG. 11A is a vector representation 1104 of a single wavelength of input optical signal 1004. For ease of explanation, the last two digits identifying each vector in these figures correspond to the last two digits of an optical signal in FIG. 10. The portion of optical signal 1004 that is reflected by beam splitter 1045 is phase shifted by 90 degrees, or $\pi/2$ radians. In FIG. 11B this is shown as the vector 1116 rotated 90 degrees counterclockwise relative to vector 1112. Accordingly, the phase of optical signal 1016 is 90 degrees ahead of optical signal 1012, and vector 1116 is shown 90 degrees ahead of vector 1112. Also, each vector has a length, or amplitude, that is approximately the square root of ½ times the length of vector 1104.

Again, optical signal 1012 is phase shifted by phase shift element 1070, resulting in optical signal 1014. Thus, the phase relationship of between vectors is 1112 and 1114 depends on the relationship between the wavelength of light and the length of the optical delay through the phase shift element. For a given wavelength, if the optical delay is an integral number of wavelengths long, an optical signal at that wavelength undergoes no net phase change after passing through the phase shift element. This can be seen graphically by a vector that rotates 360 degrees, or $2\pi$ radians, a number of times, winding up at its original position. This result is shown as a vector 1114A in FIG. 11C. If the optical delay in is an integral number of wavelengths plus a one-quarter wavelength, the result is a net 90 degrees in phase shift, shown as vector 1114B. If the optical delay is an integral number of wavelengths plus half a wavelength long, the result is vector 1114C.

FIG. 11D shows what happens to vectors 1116 and 1114A when their corresponding optical signals reach beam splitter 1050. A portion of vector 1116 is transmitted resulting in vector 1116T. A portion of optical signal 1016 is reflected, resulting in vector 1116R. Similarly, portions of vectors 1114A are transmitted (1114AT) and reflected (1114AR). FIG. 11E shows vector 1122, which is the sum of vectors 1116T and 1114AR. These vectors are in phase and thus are added. Vectors 1116R and 1114AT are out of phase and approximately equal in amplitude, so for this wavelength optical signal 1028 is near zero. FIG. 11F shows what happens when the optical signals corresponding to vectors 1116 to 1114B are combined and split at beam splitter 1050. Portions are transmitted, 1116T and 1114BT, and portions are reflected, that is phase shifted 90 degrees counterclockwise, resulting in vectors 1116R and 1114BR. The vectors 1116T and 1114BR, and 1116R and 1114BT are added together in FIG. 11G, resulting in vectors 1122 and 1128, which represent optical signals 1022 and 1028. FIG. 11H shows what happens when optical signals 1016 and 1014C are combined and split at beam splitter 1050. Portions of optical signals 1016 and 1014C are transmitted and reflected resulting in vectors 1116T, 1116R, 1114CT, and 1114CR. The vectors 1114CT and 1116R, and 1114CR and 1116T are summed together resulting in vectors 1128 and 1122 in FIG. 11H. This vector representation shows that at this wavelength, all the light is in optical signal 1028, and none is in optical signal 1022.

The operation of the next two stages of this interleaver can be seen by examining a wavelength at which the optical signal 1014 is phase shifted by 135 degrees, or $\frac{3}{4}\pi$ radians, relative to optical signal 1012. FIG. 11J is a vector representation of optical signal 1004 at such a wavelength. Again, since beam splitter 1045 reflects optical signal 1006 and transmits optical signal 1008, vector 1116 is shown as being 90 degrees advanced from vector 1112 in FIG. 11K. The optical signal 1012 corresponding vector 1112 undergoes a 135 degree phase shift in phase shift element 1070, resulting in vector 1114D in FIG. 11L. FIG. 11M shows the transmitted portion of vector 1114 and the reflected portion of vector 1116, which are combined to form vector 1128, which represents the optical signal of 1028. FIG. 11N shows the transmitted portion of vector 1116 and the reflected portion of vector 1114, which are added together, resulting in vector 1122, which represents optical signal 1022. From FIGS. 11M and 11N, it can be seen in that at this wavelength, the optical signal at 1028 has approximately twice the amplitude of the optical signal at 1022.

Since the optical phase shift for this wavelength in element 1070 is 135 degrees, or $3/4\pi$ radians, the phase shift in element 1080 is 270 degrees, or $6/4\pi$ radians. Accordingly, vector 1126 in FIG. 11O has been phase shifted 270 degrees relative to vector 1122 in FIG. 11N. Thus, the vectors in FIG. 11O retain the same amplitude as in FIGS. 11M and 11N, but are now phase shifted 90 degrees with respect to each other. FIGS. 11P and 11Q represent the reflections and transmissions at the beam splitter 1055 in FIG. 10. Since this beam splitter is a 3/97 beam splitter, only approximately the square root of three percent or 0.173 of the amplitude of each vector is reflected, and approximately the square root of 97 percent, or 0.98 of the amplitude of each vector is transmitted. Again, each reflected vector is shifted 90 degrees counterclockwise, while each transmitted vector is not phase shifted. FIG. 11P shows the transmitted portion of vector 1126 and the reflected portion of vector 1128. These two vectors are added together in FIG. 11R, resulting in vector 1142, which represents the optical signal 1042. FIG. 11Q shows the transmitted portion of vector 1128 and the reflected portion of vector 1126. These vectors are added together to form vector 1136 in FIG. 11R. Since the vectors in FIG. 11P are out of phase, the resulting vector 1142 in FIG. 11R is shorter than the vector 1126 in FIG. 11O. Conversely, since the vectors in FIG. 11Q are in phase, or aligned, resulting vector 1136 in FIG. 11R is longer than vector 1128 in FIG. 11O.

The consequence of this is that more of the optical signal at this wavelength has been shifted to optical signal 1036 relative to optical signal 1028. This means that the overall filtering and characteristic for this wavelength has been improved at the second stage as compared to the first. The changing length of these vectors means that optical signals at neighboring channels are more efficiently separated.

Vector 1136 is now phase shifted resulting in vector 1138 in FIG. 11S. The amount of this phase shift is four times the phase shift of element 1070, plus one-half a wavelength. This is four times 135 plus 180 degrees, or four times $3/4\pi$ radians plus $1/2\pi$, which is equal to 720 degrees, or $4\pi$ radians, which is a zero net phase change. Accordingly, FIG. 11S shows vector 1138 aligned with vector 1136 in FIG. 11R. FIGS. 11T and 11V show what happens to the corresponding optical signals at beam splitter 1060. In this example, beam splitter 1060 is another 3/97 beam splitter. FIG. 11T shows the transmitted portion of vector 1142 and the reflected portion of vector 1138. These two vectors together form vector 1148 in FIG. 11V. FIG. 11U shows the transmitted portion of vector 1138 and the reflected portion of vector 1142. These vectors are added to form vector 1046 in FIG. 11V. As can be seen by comparing the vectors in FIG. 11V with the vectors in FIG. 11S, more of the optical signal appears in vector 1146 of FIG. 11V as compared to vector 1138 in FIG. 11S correspondingly, vector 1148 in FIG. 11V is shorter than vector 1142 in FIG. 11S. This means that the filtering at the third stage of the interleaver is improved as compared to second stage, which was improved relative to the first stage.

Figure 12:
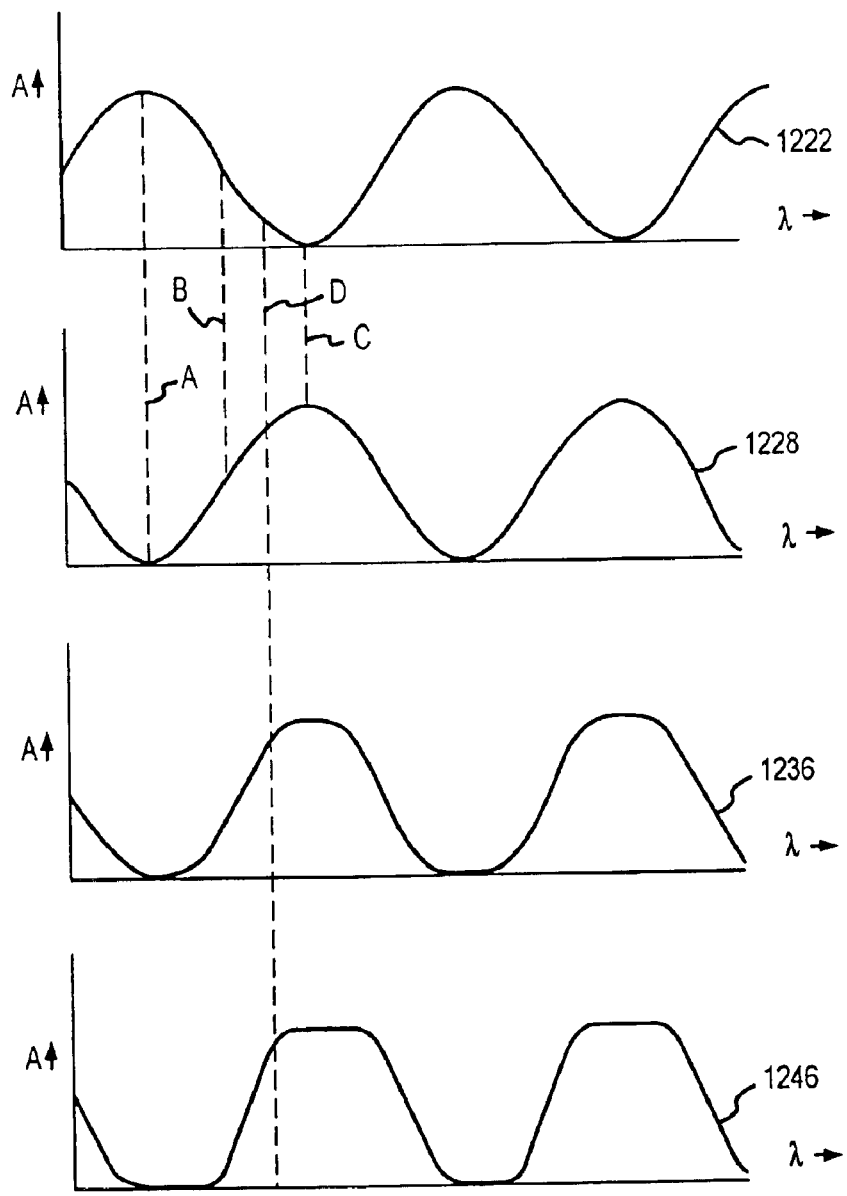
FIG. 12 shows transmission characteristics as a function of wavelength at different points of the interleaver in FIG. 10.

These results can be shown as a functional of wavelength by the waveforms in FIG. 12. FIG. 12 shows the transmission characteristic as a function of wavelength at different points of the interleaver of FIG. 10. The X-axis is wavelength, and the Y-axis is linear amplitude. Included are waveforms 1222, 1228, 1236, and 1246, which are representations of optical signals 1022, 1028, 1030, and 1046 and vectors 1122, 1128, 1130, and 1146 as a function of wavelength. Wavelength A is representative of the example 1114A in FIG. 11C, where there is no net phase shift through the optical phase shift element 1070. As shown in FIG. 11D the value of the vector 1128 is zero, and the value of vector 1122 is at a maximum. When there is a 90-degree phase shift through phase shift element 1070, vector 1114B in FIG. 11C results. As seen in FIG. 11G, resulting vectors 1122 and 1128 are equal in value, as is the case at point B in FIG. 12. At point C, the net phase shift through the phase shift element 1070 is 180 degrees, shown as vector 1114C in FIG. 11C, and the vectors in FIG. 11I result. As can be seen, the vector 1122 is zero, while the amplitude of vector 1128 is at its maximum. At point D the phase shift through phase shift element 1070 is 135 degrees, resulting in FIG. 11O, where most of the optical signal at that wavelength is in vector 1128, but a portion remains in vector 1126. Through successive stages, more of the signal amplitude appears in one leg of the stage as compared to the other. Thus, the vector length 1136 in FIG. 11R and the vector length of 1146 in FIG. 11V are successively larger, resulting in increasing values at point D for waveforms 1236 and 1246 in FIG. 12.

Figure 13:
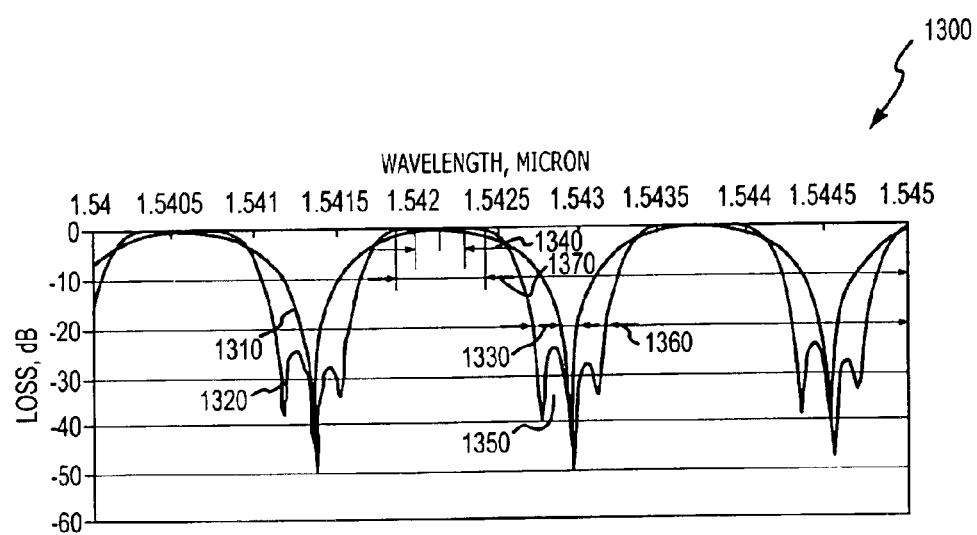
FIG. 13 is a graph of spectrum curves of optical signals after the first and third stages of the interleaver in FIG. 10.

Since this interleaver has near-boxcar-shaped spectrum curves at the output ports, that is, it approximates a brick-wall filter, the interleaver's filtering characteristic has broad pass and stop bands. FIG. 13 is a graph 1300 of spectrum curves 1310 and 1320 of optical signals after the first and third stages of the interleaver of FIG. 10. The curves are plotted against an X axis of wavelength and a Y axis of attenuation in dB. Curve 1310, corresponding to the output of the first stage, has limited cross talk, but a very narrow stop band 1330 and a narrow pass band 1340. Curve 1320, corresponding to the output of the third stage, has a small amount of cross talk 1350, but because the cross talk 1350 is present, the stop band 1360 is significantly widened. In addition, the tops of the curve are significantly flattened, resulting in a widened pass band 1370. The amount of flattening and cross talk allowed can be adjusted by selecting the number of stages of the interleaver of the present invention.

FIGS. 14A and 14B show mathematical equations for the amplitude and phase of light as a function of wavelength for the interleaver of FIG. 10. For these equations, the phase shifts due to reflective surfaces are included. Again, at each reflective surface the phase is shifted 90 degrees counterclockwise. This is expressed mathematically as a multiplication by $e^{j(\pi/2)}$. At each beam splitter, the amplitude of the reflected component is multiplied by KR, where KR=sqrt (1−T), and T is the transmittance of the beam splitter. The phase is multiplied by $e^{j(\pi/2)}$, as before. Also at each beam splitter, the amplitude of the transmitted component is multiplied by KT, where KT=sqrt(T), and the phase is unchanged. When two beam components are added, they are mathematically added to each other. By following these rules, the equations of this figure are derived.

Figure 15:
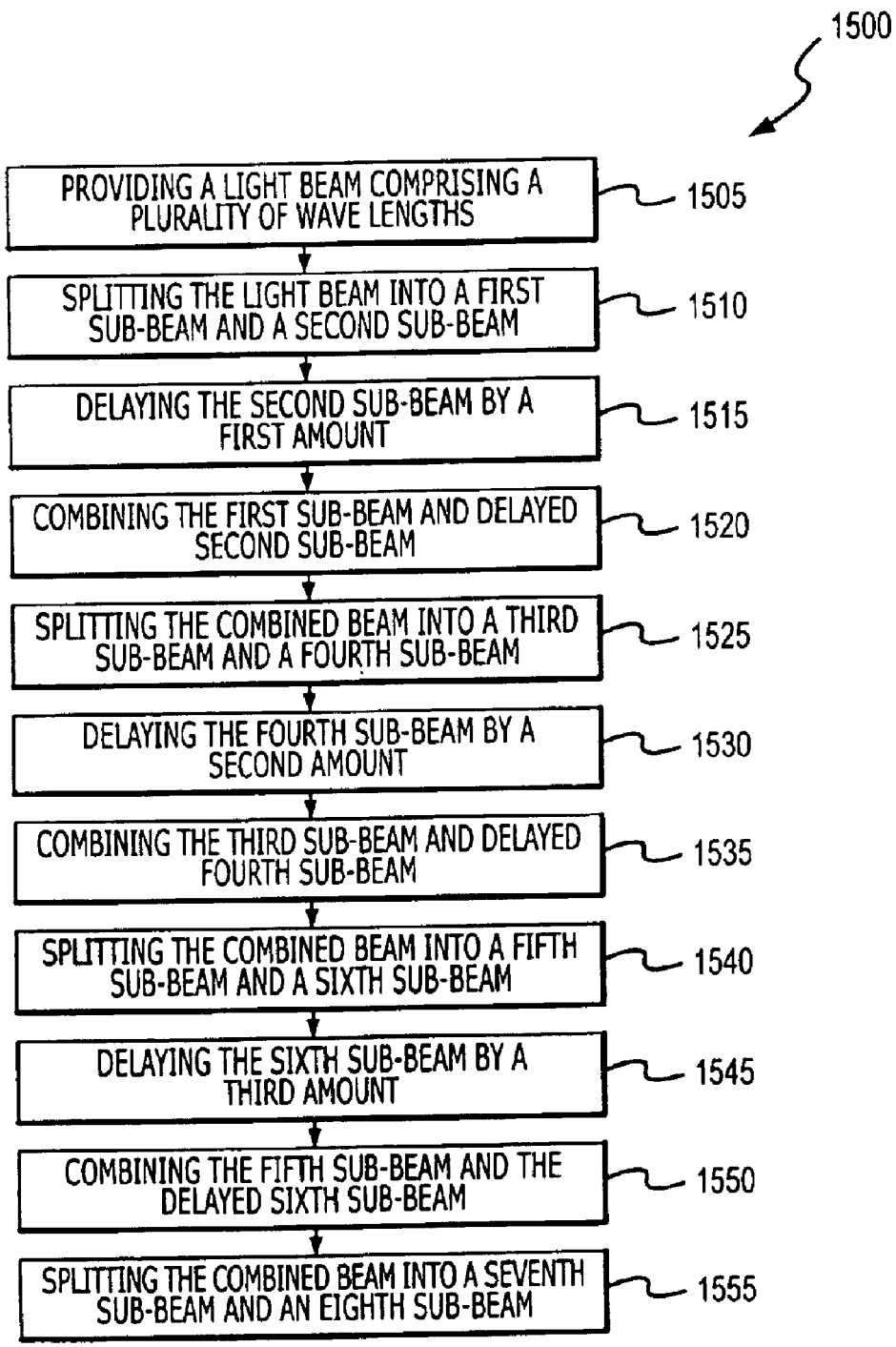
FIG. 15 is a flowchart of a method of demultiplexing optical signals consistent with one embodiment of the present invention.

FIG. 15 is a flow chart of a method of separating or demultiplexing two or more optical signals consistent with an embodiment of the present invention. In act 1505, a light beam comprising a plurality of wavelengths is provided. The light beam is split into a first sub-beam and a second sub-beam in act 1510. In act 1515, the second sub-beam is delayed by first duration, and the first sub-beam and the delayed second sub-beam are combined in act 1520. The combined beam is split into a third sub-beam and a fourth sub-beam in act 1525. In act 1530, the fourth sub-beam is delayed by a second duration, and the third sub-beam and the delayed fourth sub-beam are combined in act 1535. This combined beam is again split into a fifth sub-beam and a sixth sub-beam in act 1540. The sixth sub-beam is delayed by a third duration in act 1545, and in act 1550 the fifth sub-beam and the delayed sixth sub-beam are combined. In act 1555, the combined beam is split into a seventh sub-beam and eighth sub-beam.

Figure 16:
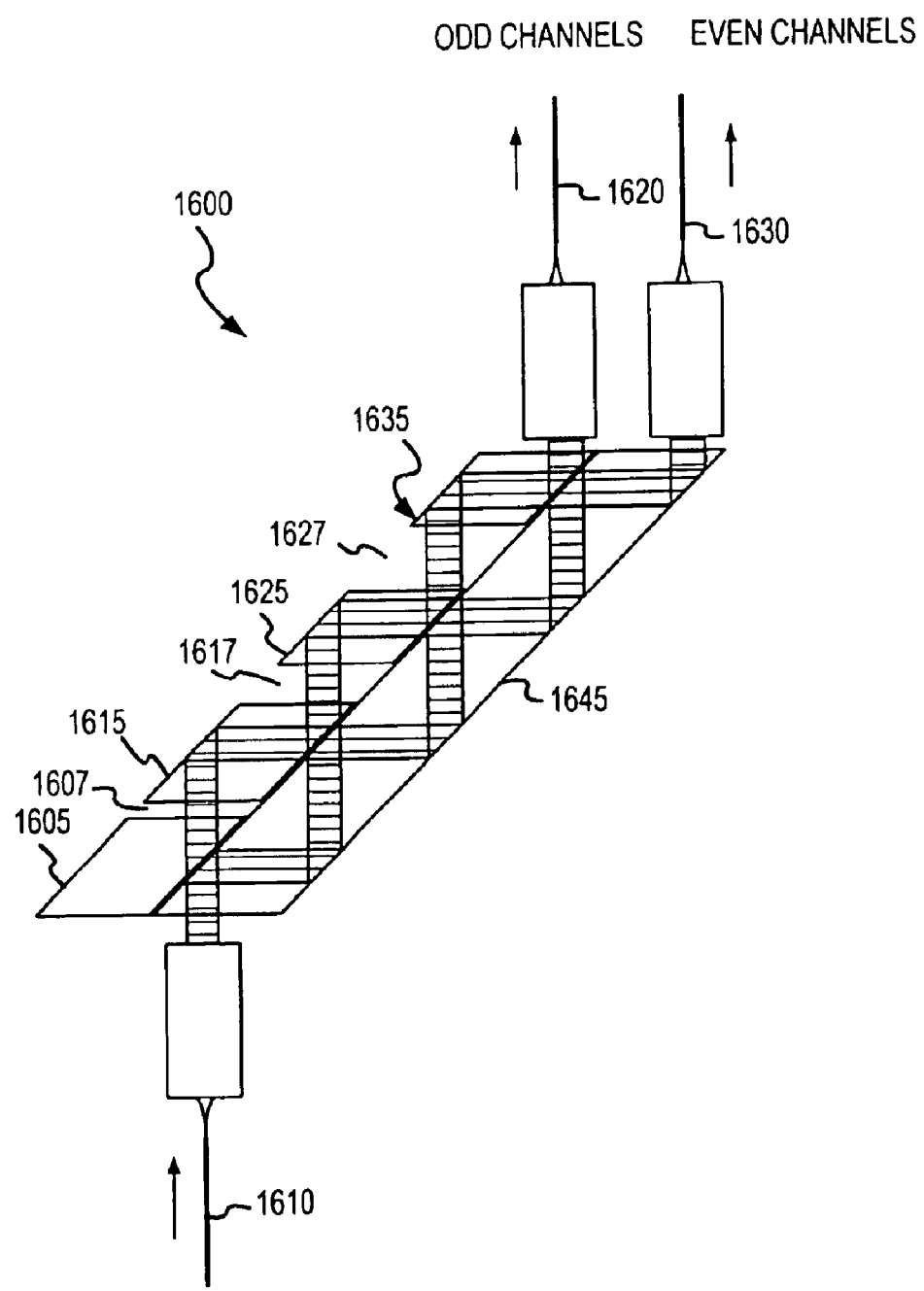
FIG. 16 shows the construction of an interleaver consistent with one embodiment of the present invention.

FIG. 16 shows another embodiment of the present invention. Beam-splitting prisms 1605, 1615, 1625, and 1635 are aligned and fixed on a base glass plate 1645. This design allows a more compact design and eases the fabrication and alignment. However, this design is more suited for smaller optical path length differences.

As the vector analysis above shows, errors in optical path differences should be minimized to reduce cross talk and enhance the interleaver filtering characteristics. In order to compensate for fabrication and alignment errors as well as variations in the refractive index of the glass used, an embodiment of the present invention has a mechanism for adjusting the optical path difference. An adjustment mechanism may be used in one or more legs of the interleaver, or one may be used in each leg. For example, the apparatus of FIG. 9 may have an adjustment mechanism in the path of beams 941, 951, and 961. Also, the apparatus of FIG. 10 may have an adjustment mechanism in the path of beams 1006, 0124, and 1034.

Figure 17:
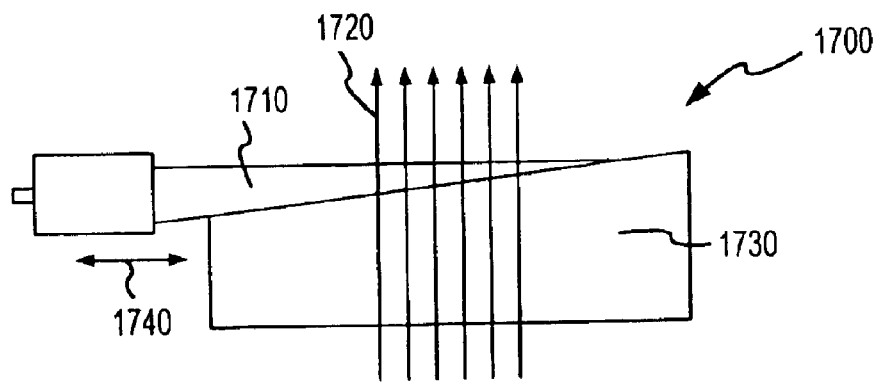
FIG. 17 shows an apparatus for adjusting an optical path difference.

FIG. 17 shows how to adjust an optical path length in one embodiment of the present invention. Included is an adjustable phase shift element formed by polyhedrons, or prisms, 1730 and 1710. As prism 1710 is moved laterally, that is in the direction indicated as 1740, the distance traveled by light beam 1720 is varied. Thus, by moving the upper prism 1710 across the optical path 1720, the optical path length can be adjusted, and the optical phase shift incurred by beam 1720 is varied.

Figure 18:
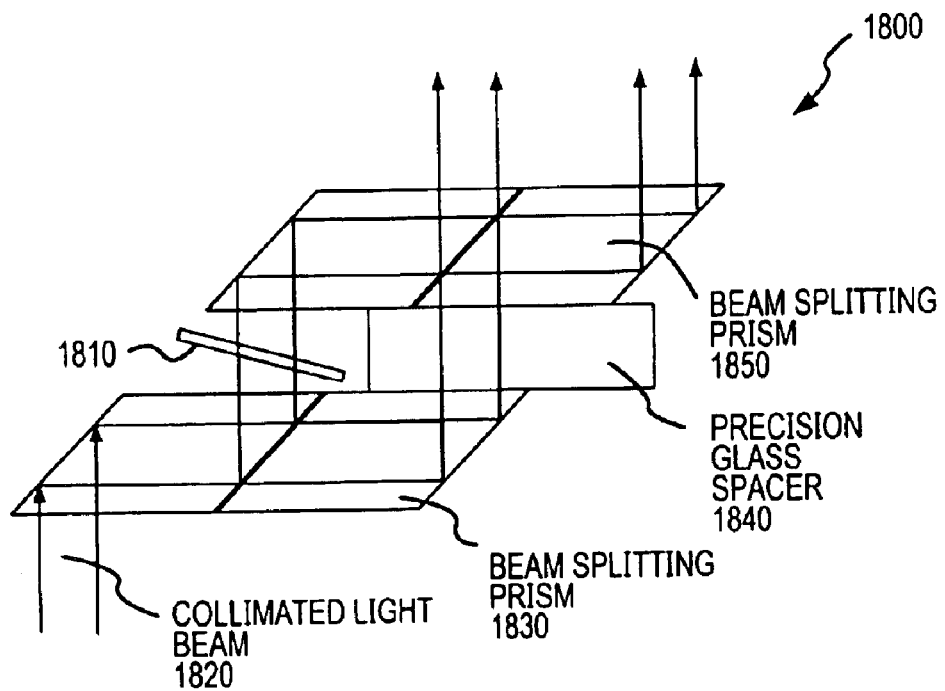
FIG. 18 shows another way to adjust an optical path difference.

FIG. 18 shows a second technique for adjusting an optical path length. A thin glass plate phase shift element 1810 is inserted into an air gap in the interleaver. Light in one leg of the interleaver passes from the beam-splitting prism 1830 to the beam-splitting prism 1850 and passes through precision glass spacer 1840. Light in the other leg of the stage leaves beam splitting-prism 1830 and passes through phase shift element 1810 on its way to the beam splitting-prism 1850. When adjustable phase shift element 1810 is horizontal, the phase shift introduced by this element is at a minimum. As the element is turned clockwise or counterclockwise, the phase shift through the element becomes longer, thus adjusting the difference in phase shifts through precision glass spacer 1840 and phase shift element 1810.

Another added functionality of an interleaver of the present invention is the ability to perform multiplexing and add/drop functions while also separating the channels.

Figures 19A, 19B:
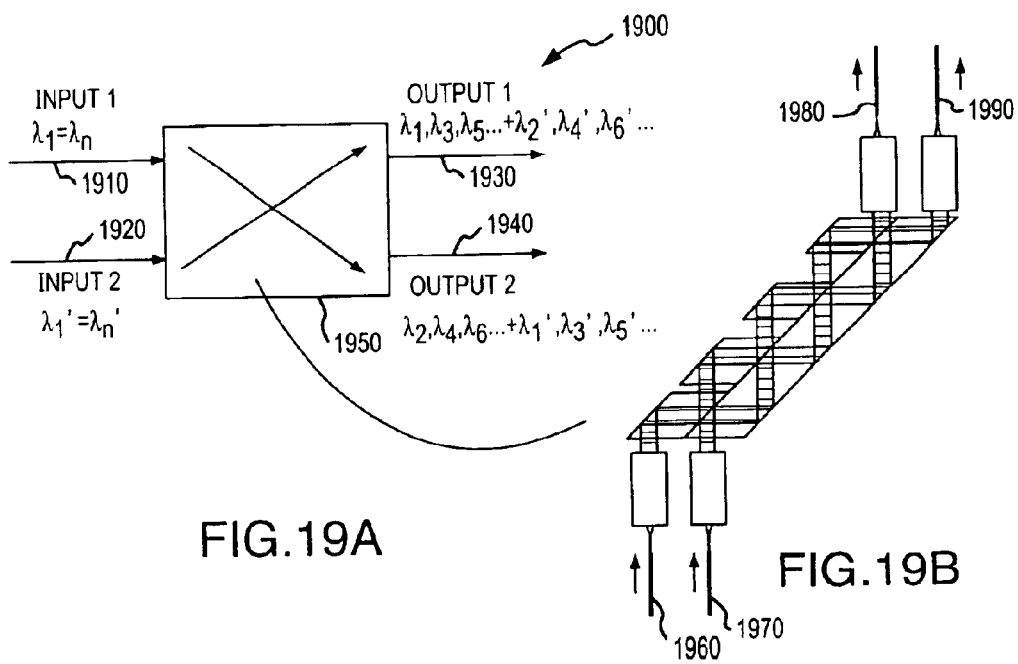
FIG. 19A is a block diagram of an interleaver performing an add/drop function in accordance with the present invention.
FIG. 19B shows how the interleaver of FIG. 9 may be used as an add/drop.

FIG. 19A is a block diagram of an interleaver 1900 performing the add/drop function in accordance with the present invention. The interleaver 1900 may be similar to those illustrated in FIG. 9 or 16, with a second input for a second signal containing channels, $\lambda_1', \lambda_2', \ldots, \lambda_n'$, via the optical fiber 1920. The second signal is also separated into its odd and even channels similar to the first signal containing $\lambda_1 - \lambda_n$. The result is that the output fiber 1930 contains the odd channels from the first signal ($\lambda_1, \lambda_3, \lambda_5, \ldots$) plus the even channels from the second signal ($\lambda_2', \lambda_4', \lambda_6', \ldots$). Output fiber 1940 contains the even channels from the first signal ($\lambda_2, \lambda_4, \lambda_6, \ldots$) and odd channels from the second signal ($\lambda_1', \lambda_3', \lambda_5', \ldots$). By manipulating which interleavers in a WDM perform the add/drop function, certain channels can be targeted. FIG. 19B shows how the interleaver of FIG. 16 may be used as an add/drop.

One embodiment of the present invention uses commercially available optical glasses, dielectric beam splitting coatings, and anti-reflection coatings. In this embodiment, a glass plate can be fabricated with high parallelism and then cut into prisms and base glass plates. These prisms and base plates are then coated with anti-reflective coating and dielectric partial reflection coatings on the surfaces in optical path. By optically bonding these prisms and base glass plates together, with or without adhesives, the reflective surfaces are positioned and aligned.

Figures 20A, 20B:
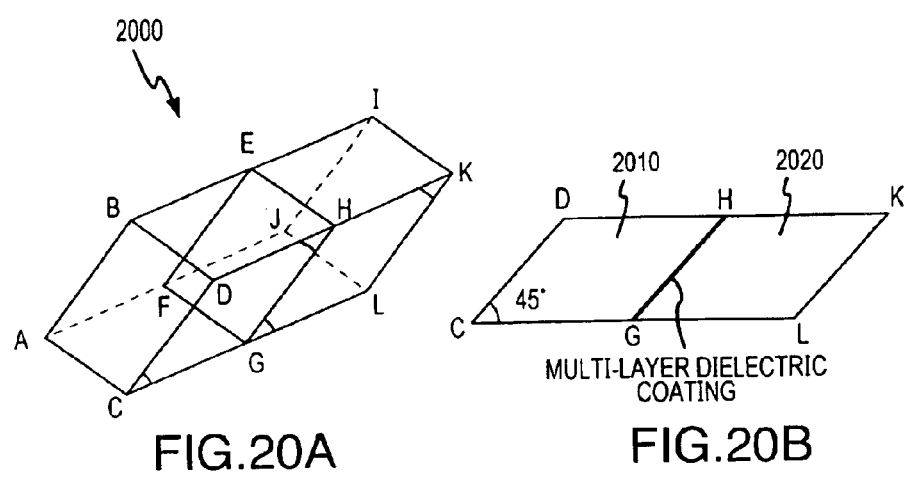
FIGS. 20A and 20B provide more detailed views of a prism that may be used in the construction of an interleaver consistent with an embodiment of the present invention.

FIGS. 20A and 20B provide more detailed views of a prism made up of two smaller prisms or sub-prisms 2010 and 2020 that may be used in the construction of an interleaver consistent with an embodiment of the present invention. The first sub-prism 2010 forms a polyhedron having front, back, left, right, top, and bottom sides. These labels relate only to the relative positions of the sides. The front side of the first sub-prism 2010 is bounded by CDHG, and the backside is bounded by ABEF, and both form parallelograms. In one embodiment, the internal angles of the parallelogram are approximately 45 and 135 degrees. The left side is bounded by ABDC, and the right side by EHGF. The top is bounded by BDHE, and the bottom by ACGF. The left, right, top, and bottom sides form rectangles. One skilled in the art may readily envision other shapes. For example, the left and right sides might form trapezoids. In one embodiment, the left side is a reflective surface that provides approximately a total internal reflection of an incident beam. This surface may be polished and protectively coated to prevent scratches and marks that would otherwise cause scattering.

The second sub-prism 2020 is similarly shaped and oriented. The front side is bounded by HKLG, and the backside by EIJF. These faces form parallelograms. A right side is bounded by IKLJ, and the left side is bounded by EHGF. The top is bounded by EHKI and the bottom by JLGF. Again, other shapes for each of the sides are readily envisioned, and may be substituted without departing from the present convention. In one embodiment, the right side of the second sub-prism 2020 is also a reflective surface, which may be polished and protectively coated. A partially reflecting dielectric may be placed between the right side of sub-prism 2010 and the left side of sub-prism 2020, along EHGF. Some or all of the surfaces may be coated with an anti-reflective coating. The first and second sub-prisms may be joined by an epoxy or other adhesive. In a specific embodiment, a silica based epoxy is used.

Figure 21A:
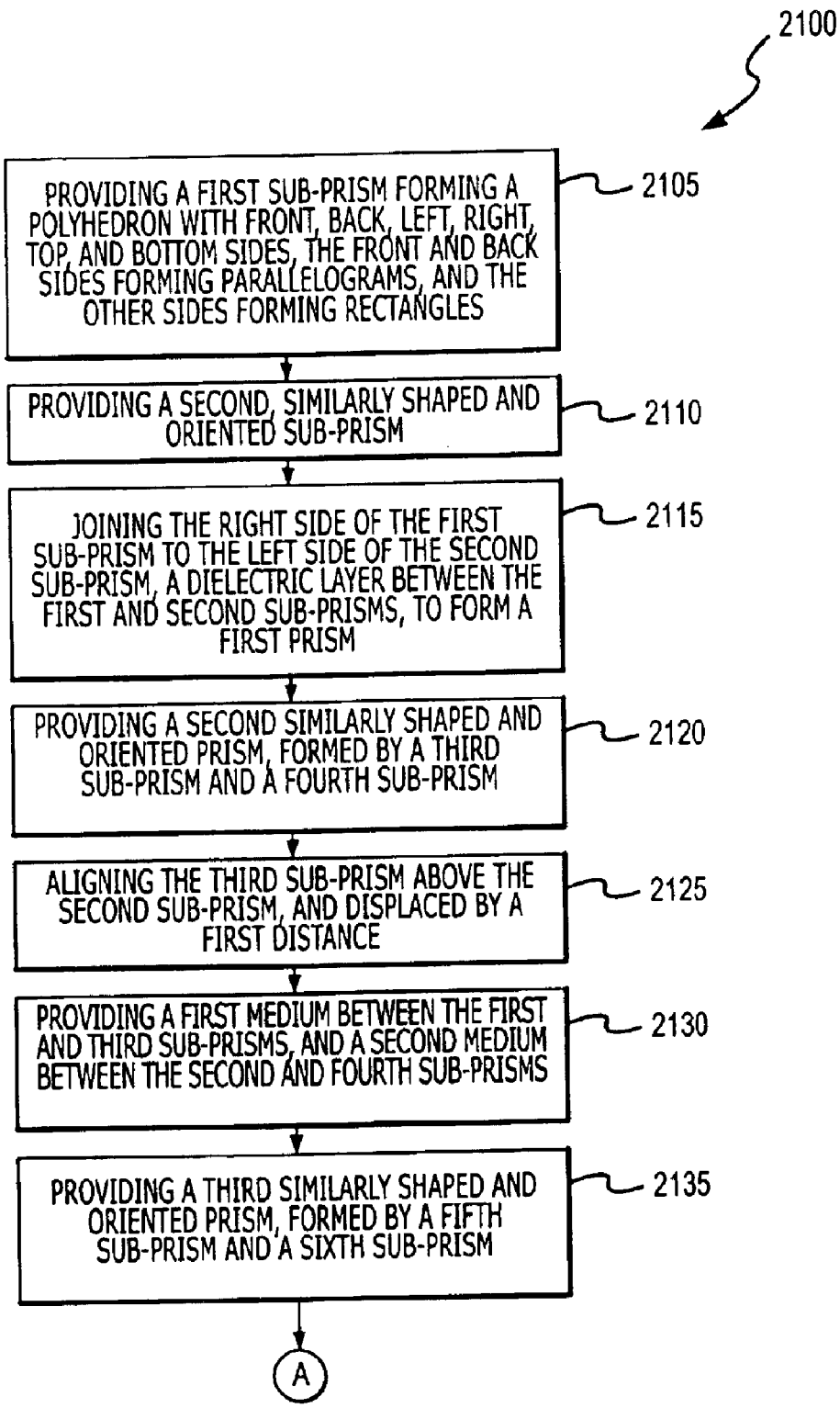
FIGS. 21A and 21B together are a flowchart of a method of building an interleaver consistent with an embodiment of the present invention.
Figure 21B:
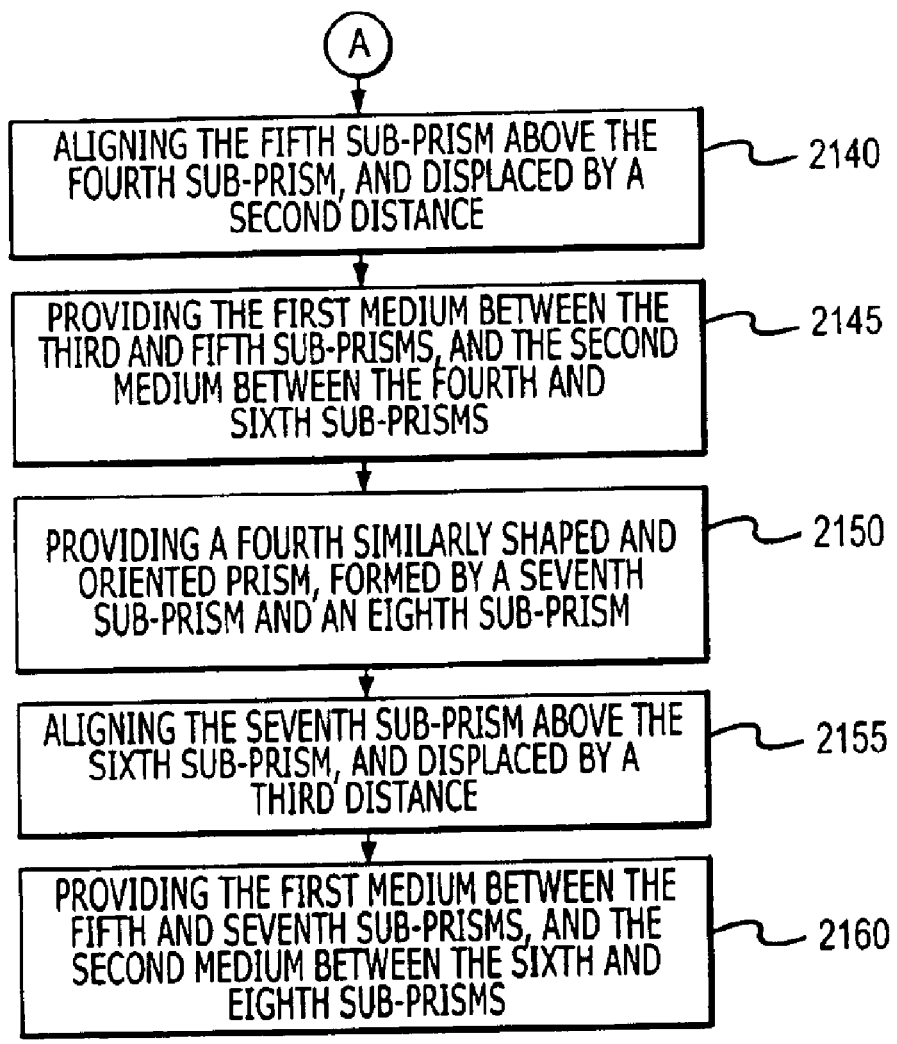

FIGS. 21A and 21B together are a flowchart of a method of constructing an interleaver consistent with an embodiment of the present invention. In act 2105, a first sub-prism is provided. This sub-prism forms a polyhedron having front, back, left, right, top comment and bottom sides. These labels are only used to indicate the relative position of each of the sides. The front and back sides form parallelograms, and the other sides form rectangles. In other embodiments, other shapes may be used. For example, some sides may be rhomboids or trapezoids. The left side of this first sub-prism is a reflective surface.

In act 2110 a second, similarly shaped and oriented sub-prism is provided. The right side of the second sub-prism is also a reflective surface. These reflected surfaces provide approximately a total internal reflection of an incident beam. In act 2115, the right side of the first sub-prism is joined to the left side of the second sub-prism, and a dielectric layer is placed between the first and second sub-prisms. This dielectric layer may be substantially non-polarizing in the range of wavelengths used. This complete structure, first and second sub-prisms, reflective surfaces, and dielectric layer, form a first prism.

In act 2120, a second similarly constructed, shaped, and oriented prism, formed by a third sub-prism and a fourth sub-prism, is provided. The third sub-prism is aligned above the second sub prism and displaced by a first distance in act 2125. In act 2130, a first medium is provided between the first and third sub-prisms, and a second medium is provided between the second and fourth sub-prisms. In act 2135, a third similarly shaped and oriented prism, formed by a fifth sub-prism and a sixth sub-prism is provided. In act 2140, the fifth sub-prism is aligned above the fourth sub-prism and displaced by a second distance. The first medium is provided between the third and fifth sub-prisms, and the second medium is provided between the fourth and sixth sub-prisms. A fourth similarly constructed, shaped, and oriented prism, formed by a seventh sub-prism and an eighth sub-prism is provided in act 2150. In act 2155, the seventh sub-prism is aligned above the sixth sub-prism, and displaced by a third distance. The first medium is provided between the fifth and seventh sub-prisms, and the second medium is provided between the sixth and eighth sub-prisms. Such a construction results in a compact design that is easy to fabricate and align.

Figure 22A:
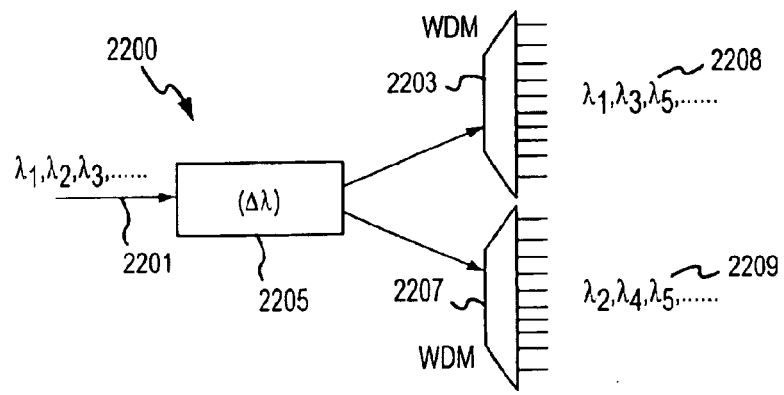
FIGS. 22A through 22C show how interleavers consistent with the present invention may be cascaded with other circuits and interleavers.
Figure 22B:
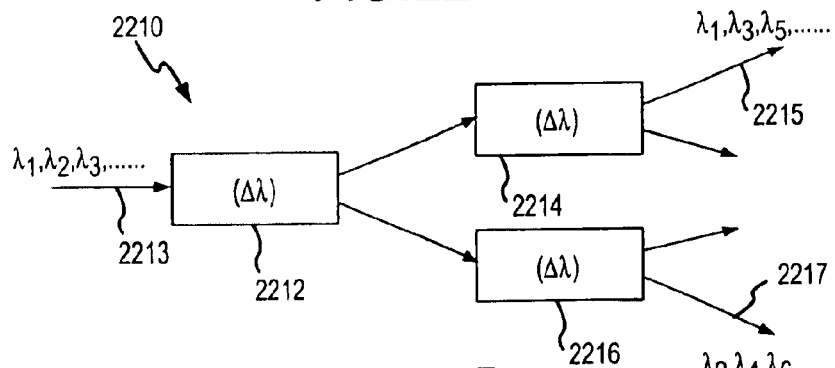
Figure 22C:
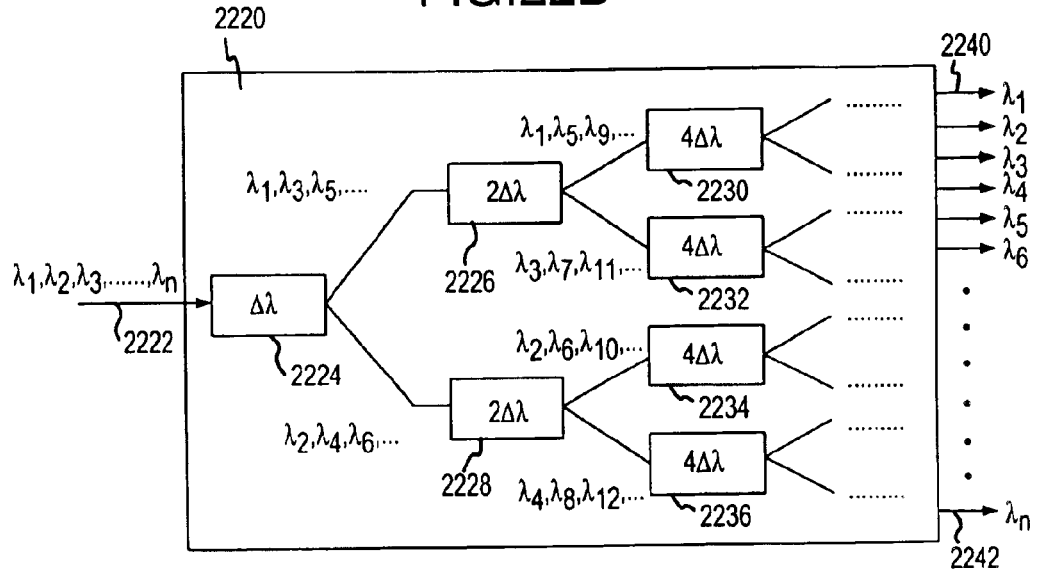

FIGS. 22A–22C show how interleavers consistent with the present invention may be cascaded with other circuits and interleavers. FIG. 22A illustrates how WDMs 2203 and 2207 may be used following interleaver 2205 to separate each channel into a separate output. In this way, thin film filters as well as other WDM devices with wide channel spacing can be used in combination with interleavers to separate channels with narrow channel spacing, and reduce the nonuniformity in insertion losses among channels.

As discussed above with respect to FIG. 13, the broadening of pass and stop band characteristics of an interleaver according to an embodiment of the present invention is achieved at the expense of higher cross talk among adjacent channels. For wavelength multiplexing, isolation and cross talk are not as central, so this may not be a problem. But for wavelength demultiplexing, it is desirable to suppress cross talk while increasing channel isolation.

FIG. 22B shows multiple interleavers cascaded to achieve this result. In this configuration, each of the two output branches of the first interleaver having wavelength separation capability of Δλ are coupled to an input branch of one of two second interleavers, also having the same wavelength separation capability of Δλ.

FIG. 22C shows a cascade of interleavers, the interleavers at each level having twice the separation capability of the previous level. In this way, individual wavelengths may be provided at separate outputs.

Figure 23:
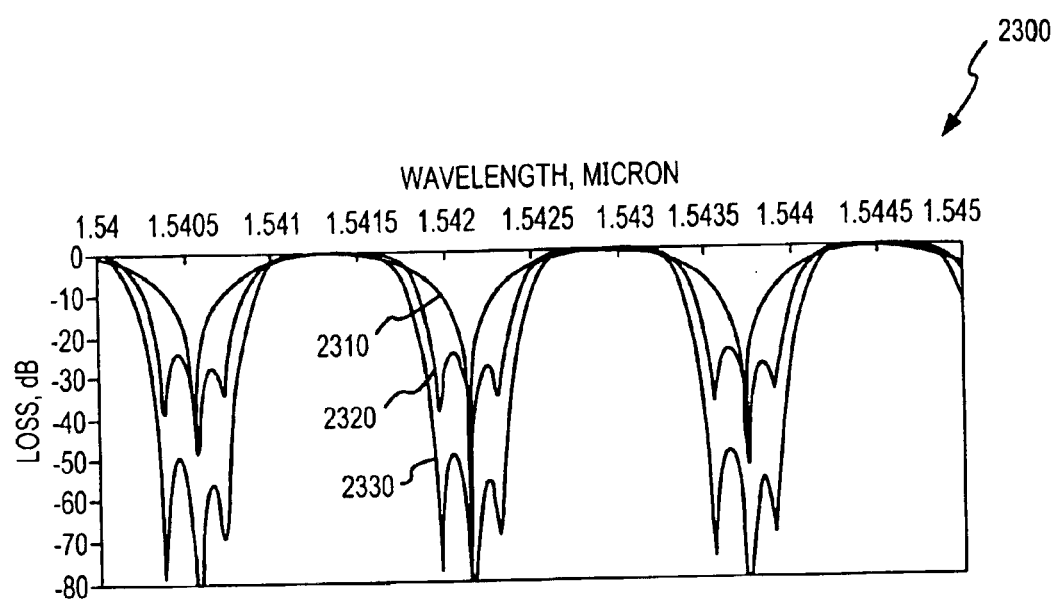
FIG. 23 shows the filtering characteristics of the two cascaded interleavers of FIG. 22B.

FIG. 23 shows the filtering characteristics of the two cascaded interleavers of FIG. 22B. The resulting output signal 2330 from the output port of each of the two second-stage interleavers has lower cross talk and wider stop band than the signal 2320 from the output ports of the first interleaver alone. This is because the signal is processed through two interleavers with the same transmission function, which, on a logarithmic or dB scale, doubles the suppression of cross talk.

The foregoing description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. It is intended that the scope of the invention be defined by the following claims.

What is claimed is:

1. A method of demultiplexing a first optical signal at first wavelength and a second optical signal at a second wavelength comprising:

providing a light beam comprising the first optical signal and the second optical signal;

reflecting a first portion of the light beam to create a first sub-beam;

transmitting a second portion of the light beam to create a second sub-beam;

delaying the second sub-beam by a first duration;

reflecting a first portion of the first sub-beam;

transmitting a second portion of the first sub-beam;

reflecting a first portion of the delayed second sub-beam;

transmitting a second portion of the delayed second sub-beam;

combining the reflected first portion of the first sub-beam with the transmitted second portion of the delayed second sub-beam to form a third sub-beam;

combining the reflected first portion of the delayed second sub-beam with the transmitted second portion of the first sub-beam to form a fourth sub-beam;

delaying the fourth sub-beam by a second duration;

reflecting a first portion of the third sub-beam;

transmitting a second portion of the third sub-beam;

reflecting a first portion of the delayed fourth sub-beam;

transmitting a second portion of the delayed fourth sub-beam;

combining the reflected first portion of the third sub-beam with the transmitted second portion of the delayed fourth sub-beam to form a fifth sub-beam; and combining the reflected first portion of the delayed fourth sub-beam with the transmitted second portion of the third sub-beam to form a sixth sub-beam, wherein the fifth sub-beam comprises a substantial majority of the first optical signal and the sixth sub-beam comprises a substantial majority of the second optical signal.

2. The method of claim 1 further comprising:

delaying the sixth sub-beam by a third duration;

reflecting a first portion of the fifth sub-beam;

transmitting a second portion of the fifth sub-beam;

reflecting a first portion of the delayed sixth sub-beam;

transmitting a second portion of the delayed sixth sub-beam;

combining the reflected first portion of the fifth sub-beam with the second portion of the delayed sixth sub-beam to form a seventh sub-beam; and combining the reflected first portion of the delayed sixth sub-beam with the transmitted second portion of the fifth sub-beam to form an eighth sub-beam.

3. The method of claim 1 wherein a portion of the first optical signal in the reflected first portion of the third sub-beam adds constructively with a portion of the first optical signal in the transmitted second portion of the fourth sub-beam, a portion of the first optical signal in the transmitted second portion of the third sub-beam adds destructively with a portion of the first optical signal in the reflected first portion of the fourth sub-beam, a portion of the second optical signal in the reflected first portion of the third sub-beam adds destructively with a portion of the second optical signal in the transmitted second portion of th fourth sub-beam, and a portion of the second optical signal in the transmitted second portion of the third sub-beam adds constructively with a portion of the second optical signal in the reflected first portion of the fourth sub-beam.

4. The method of claim 1 wherein the reflecting a first portion of the light beam to create a first sub-beam and transmitting a second portion of the light beam to create a second sub-beam are done using a first 50/50 beam splitter, and the reflecting first portion of the first sub-beam, transmitting a second portion of the first sub-beam, reflecting a first portion of the delayed second sub-beam, and transmitting a second portion of the delayed second sub-beam are done using a second 50/50 beam splitter, and the first and second 50/50 beam splitters reflect approximately between 45 and 55 percent and transmit approximately between 45 and 55 percent of incident light at the first and second wavelengths.

5. The method of claim 4 wherein the reflecting a first portion of the third sub-beam, transmitting a second portion of the third sub-beam, reflecting a first portion of the delayed fourth sub-beam, and transmitting a second portion of the delayed fourth sub-beam are done using a 3/97 beam splitter, and the 3/97 beam splitter reflects approximately between 2 and 5 percent and transmits approximately between 95 and 98 percent of incident light at the first and second wavelengths.

6. The method of claim 5 wherein the 50/50 and 3/97 beam splitters are substantially nonpolarizing at the first and second wavelengths.

7. The method of claim 5 wherein the second sub-beam is delayed a first duration by a first glass spacer, and the fourth sub-beam is delayed a second duration by a second glass spacer, and the second duration is approximately twice the first duration.

8. The method of claim 7 wherein the second duration is approximately twice the first duration, and the third duration is approximately twice the first duration.

9. A wavelength division multiplexer comprising:

a first prism forming a polyhedron and having front, back, left, right, top, and bottom sides;

a second prism forming a polyhedron and having front, back, left, right, top, and bottom sides, the right side of the first prism aligned with the left side of the second prism;

a third prism forming a polyhedron and having front, back, left, right, top and bottom sides, the bottom side directly above the top side of the second prism and offset by a first distance;

a fourth prism forming a polyhedron and having front, back, left, right, top, and bottom sides, the right side of the third prism aligned with the left side of the fourth prism;

a fifth prism forming a polyhedron and having front, back, left, right, top and bottom sides, the bottom side directly above the top side of the fourth prism and offset by a second distance;

a sixth prism forming a polyhedron and having front, back, left, right, top, and bottom sides, the right side of the fifth prism aligned with the left side of the sixth prism;

a first partially reflecting dielectric layer between the first prism and the second prism;

a second partially reflecting dielectric layer between the third prism and the fourth prism;

a third partially reflecting dielectric layer between the fifth prism and the sixth prism;

a first optical delay between the right side of the second prism and the second partially reflecting dielectric layer; and a second optical delay between the right side of the fourth prism and the third partially reflecting dielectric layer.

10. The wavelength division multiplexer of claim 9 further comprising:

a seventh prism forming a polyhedron and having front, back, left, right, top, and bottom sides, the bottom side directly above the top side of the sixth prism and offset by a third distance;

an eighth prism forming a polyhedron and having front, back, left, right, top, and bottom sides, the right side of the seventh prism aligned with the left side of the eighth prism;

a fourth partially reflecting dielectric layer between the seventh prism and the eighth prism; and a third optical delay between the right side of the sixth prism and the fourth partially reflecting dielectric layer.

11. The wavelength division multiplexer of claim 9 wherein the front and back sides of the first, second, third, fourth, fifth, and sixth prisms are parallelograms.

12. The wavelength division multiplexer of claim 11 wherein the left, right, top, and bottom sides of the first, second, third, fourth, fifth, and sixth prisms are rectangles.

13. The wavelength division multiplexer of claim 9 wherein the first, second, third, fourth, fifth, and sixth prisms are glass.

14. The wavelength division multiplexer of claim 9 wherein the first optical delay and the second optical delay are substantially comprised of a glass selected from the group consisting of BK-7, FK-51, and FK-52.

15. The wavelength division multiplexer of claim 14 wherein the second distance is approximately twice the first distance, and the third distance is approximately twice the second distance.

16. The wavelength division multiplexer of claim 14 wherein the first partially reflecting dielectric layer forms a 50/50 beam splitter, the second partially reflecting dielectric layer forms a 50/50 beam splitter, the third partially reflecting dielectric layer forms a 3/97 beam splitter, and the fourth partially reflecting dielectric layer forms a 3/97 beam splitter, wherein the 50/50 beam splitters reflect approximately between 45 and 55 percent and transmit approximately between 45 and 55 percent of incident light at a wavelength, and the 3/97 beam splitters reflect approximately between 2 and 5 percent and transmit approximately between 95 and 98 percent of incident light at the wavelength.

17. The wavelength division multiplexer of claim 9 wherein the front and back sides of each of the prisms are parallelograms having sides forming two 45 degree and two 135 degree angles.

* * * * *